(12) United States Patent
Sakurai

(10) Patent No.: US 8,344,692 B2
(45) Date of Patent: Jan. 1, 2013

(54) CHARGING DEVICE AND CHARGING STRUCTURE

(75) Inventor: Masato Sakurai, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 393 days.

(21) Appl. No.: 12/795,972

(22) Filed: Jun. 8, 2010

(65) Prior Publication Data

US 2010/0315040 A1     Dec. 16, 2010

(30) Foreign Application Priority Data

Jun. 12, 2009   (JP) .................. 2009-140742

(51) Int. Cl.
*H02J 7/00*     (2006.01)
*B60K 1/00*     (2006.01)
*B60L 1/00*     (2006.01)

(52) U.S. Cl. .............. 320/109; 180/65.1; 307/10.1

(58) Field of Classification Search .............. 320/109
See application file for complete search history.

(56) References Cited

U.S. PATENT DOCUMENTS

| 5,462,439 | A  | * | 10/1995 | Keith  ........................... | 320/109 |
| 5,909,099 | A  | * | 6/1999  | Watanabe et al. ............. | 320/108 |
| 7,602,143 | B2 | * | 10/2009 | Capizzo ........................ | 320/109 |

FOREIGN PATENT DOCUMENTS

JP           11-122714 A      4/1999

* cited by examiner

*Primary Examiner* — M'Baye Diao
(74) *Attorney, Agent, or Firm* — McDermott Will & Emery LLP

(57) ABSTRACT

A charging device includes an air nozzle that prevents power-feeding-side terminals from becoming wet by blasting air, fitting switches operated when a power feeding connector is removed from a connector holding portion, and an ECU that activates an air compressor and a vacuum pump on the basis of operations of the fitting switches. The power-feeding-side terminals can be prevented from becoming wet while the power feeding connector is attached to a power receiving connector of an electric vehicle after being removed from the connector holding portion.

9 Claims, 13 Drawing Sheets

(a)

(a)

(b)

50 : Charging device
67 : Air nozzle
68 : Power feeding connector
73 : Connector holding portion
77 : First fitting switch (operation switch)
78 : Second fitting switch (operation switch)

Fig. 8

| Charging operation | Power feeding gun 69 | First fitting switch 77 (normally Off) | Second fitting switch 78 (normally Off) | Release switch 79 (normally on) | Air compressor 55 and vacuum pump 56 | Timer 148 | State of charging device 50 |
|---|---|---|---|---|---|---|---|
| 1 | Attached to charging device 50 (pre-charging) | On | On | On | Off | Off | Charging standby |
| 2 | Release switch 79 operated for removal operation | ← | ← | Off | Blower Operated | ← | Removal assistance |
| 3 | Moved from charging device 50 to electric vehicle 100 | Off | Off | Off or on | ← | ← | Soaking prevention moisture removal |
| 4 | Attached to power receiving port 101 | ← | On | On | Vacuum Operated | ← | Attachment assistance fixed adsorption |
| 5 | Charging | ← | ← | ← | ← | ← | Fixed adsorption |
| 6 | Release switch 79 operated for removal operation | ← | ← | Off | Blower Operated | ← | Fixed adsorption release removal assistance |
| 7 | Moved from electric vehicle 100 to charging device 50 | ← | Off | Off or on | ← | ← | Soaking prevention moisture removal |
| 8 | Returned to connector holding portion 73 | ← | On | On | Vacuum Operated | ← | Attachment assistance |
| 9 | Attached to charging device 50 (post-charging) | On | ← | ← | ← | On | Fixed adsorption Return after predetermined time |

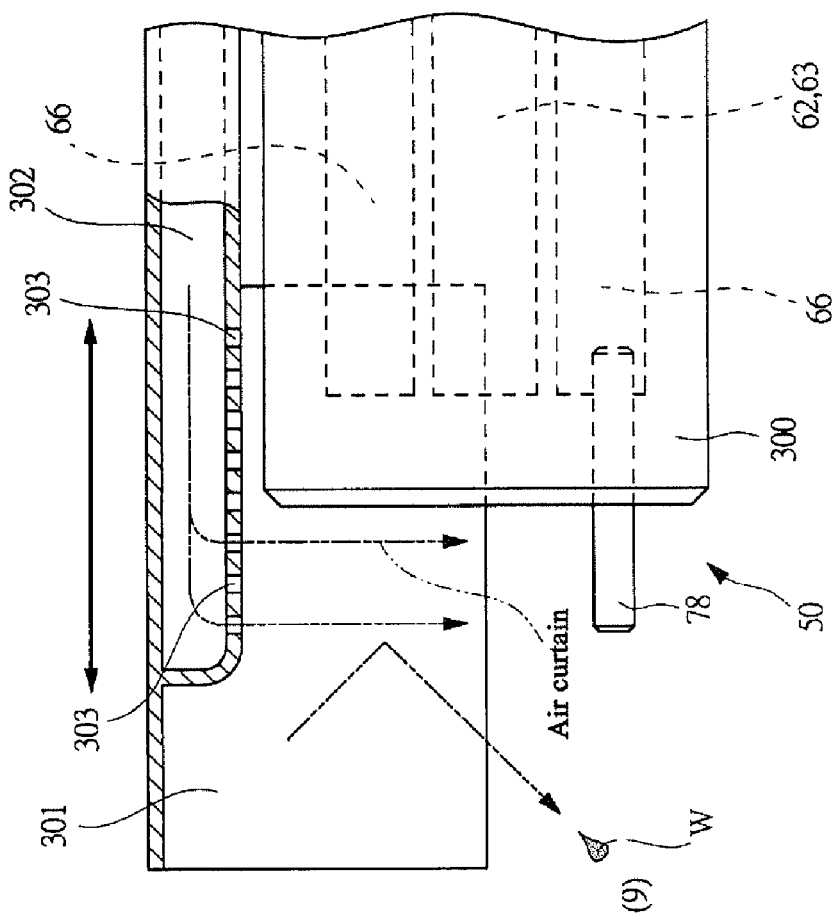
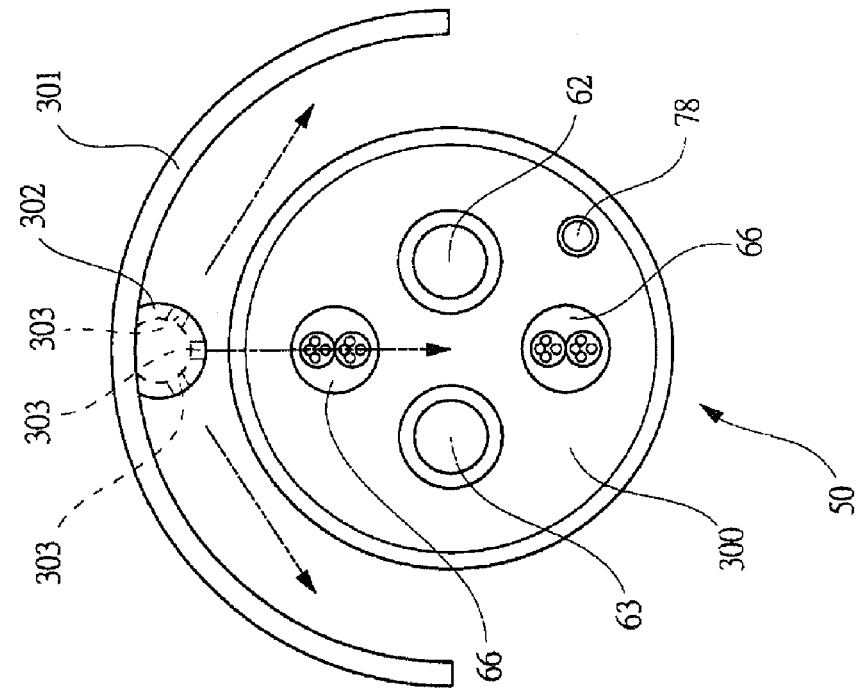

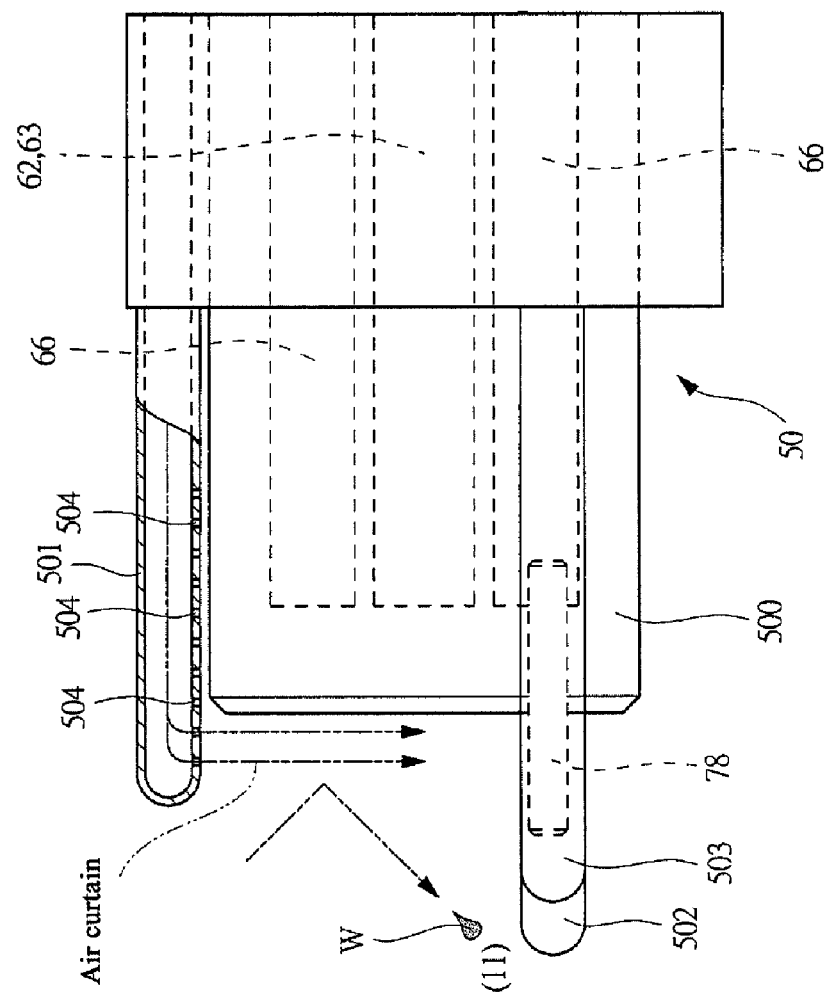
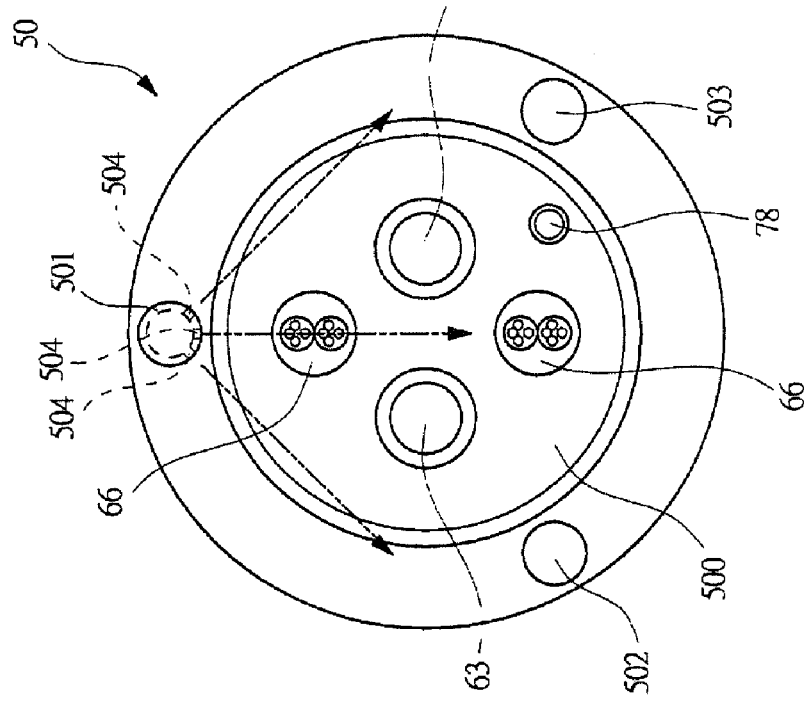

CHARGING DEVICE AND CHARGING STRUCTURE

CROSS-REFERENCE TO RELATED APPLICATIONS

The disclosure of Japanese Patent Application No. 2009-140742, filed on Jun. 12, 2009 including the specification, drawings and abstract, is incorporated herein by reference in its entirety.

BACKGROUND OF THE INVENTION

1. Field of the Invention

The present invention relates to charging devices and charging structures for charging secondary batteries installed in a vehicle.

2. Description of the Related Art

Vehicles that are driven using an electric motor include electric vehicles (EV) that employ only an electric motor as a drive source and hybrid electric vehicles (HEV) having both an electric motor and an engine as drive sources. An in-vehicle battery (secondary battery) is installed in both types of vehicle to supply power to the electric motor, and when a state of charge of the in-vehicle battery decreases, the in-vehicle battery must be charged using a household commercial power supply or a charging device provided at a rapid charging station. Note that in a hybrid vehicle, the in-vehicle battery is normally charged by driving the engine, but depending on the state of charge of the in-vehicle battery, the in-vehicle battery may be charged using a charging device or the like rather than by driving the engine.

As vehicles having an electric motor become more widespread, the number of rapid charging stations at which the in-vehicle battery can be partially charged quickly while on the road has increased. With a rapid charging station, in contrast to a gas filling station, there is no need to bury storage tanks underground, manage gasoline storage amounts, and so on, and therefore a rapid charging station can be installed in a small space and at a low cost. On the other hand, when a charging device is annexed to an outdoor parking lot, for example, it is often exposed to wind, rain, and so on, and therefore the charging device is preferably provided with a structure that exhibits superior weather resistance.

Japanese Patent Application Laid-open No. 1999-122714 (FIG. 1) describes charging device of this type. The charging device described in Japanese Patent Application Laid-open No. 1999-122714 (FIG. 1) includes a pole and a charging connector, between which a cable is provided. The charging connector is housed in a connector housing portion formed on a side portion of the pole such that a tip end side of the charging connector is oriented downward. Thus, rainwater or the like adhered to the charging connector is caused to drip into the connector housing portion, from which the rainwater or the like can be discharged to the outside through a drainage hole in the connector housing portion. By attaching the charging connector to the connector housing portion in this manner, rainwater or the like adhered to the charging connector is caused to drip down, thereby preventing problems such as short-circuits from occurring while the charging device is in use.

However, when the charging device described in Japanese Patent Application Laid-open No. 1999-122714 (FIG. 1) is used in an outdoor location without a roof or the like, the following problem may occur: when the charging connector is detached from the pole and moved to a vehicle on a rainy day or the like, the charging connector becomes wet unless an operator uses an umbrella or the like. If charging is performed after the rainwater or the like has infiltrated the charging connector, an insulating property of a plug provided inside the charging connector may deteriorate, increasing the likelihood of a short-circuit, interruption of a charging function of the charging device due to the short-circuit (activation of a safety device), and so on. Therefore, to ensure that charging can be performed comfortably even on a rainy day or the like, a charging device having improved waterproofing reliability (weather resistance) must be investigated anew.

SUMMARY OF THE INVENTION

An object of the present invention is to provide a charging device and a charging structure with which short-circuits and associated problems can be prevented reliably even when the charging device is used in an outdoor location without a roof or the like.

A charging device according to the present invention charges a secondary battery installed in a vehicle via a power receiving connector provided in the vehicle, and includes: a main body portion housing a power converter; a current carrying cable, one end side of which is connected to the power converter; a power feeding plug that is provided on the other end side of the current carrying cable and can be connected to a power receiving plug of the power receiving connector; a power feeding connector that is provided on the other end side of the current carrying cable and can be connected to the power receiving connector; an air duct provided in alignment with the current carrying cable such that air flows through an interior thereof; an air nozzle that is provided in the power feeding connector and blasts the air flowing through the air duct to prevent the power feeding plug from becoming wet; an air supply source provided on one end side of the air duct to supply the air to the air duct; a connector holding portion provided in the main body portion to hold the power feeding connector removably; an operation switch that is provided between the power feeding connector and the connector holding portion and operated when the power feeding connector is removed from the connector holding portion; and a controller housed in the main body portion to activate the air supply source on the basis of an operation of the operation switch.

In the charging device according to the present invention, the air supply source is housed in the main body portion.

In the charging device according to the present invention, the air nozzle is provided between a plus terminal and a minus terminal forming the power feeding plug, and the air nozzle blasts the air radially in an orthogonal direction to an axial direction of the power feeding plug.

In the charging device according to the present invention, at least one air nozzle is provided on an outer side of the power feeding plug, and the air nozzle forms an air curtain that covers the power feeding plug.

A charging structure according to the present invention includes a power receiving plug connected to a secondary battery installed in a vehicle and a power feeding plug connected to a power converter of a charging device, and connects the power feeding plug to the power receiving plug in order to charge the secondary battery. The charging structure includes: a power receiving connector that is provided in the vehicle and includes the power receiving plug; a power feeding connector that is provided in the charging device and includes the power feeding plug; an attachment port that is provided in the power receiving connector and guides attachment of the power feeding connector; an air nozzle that is provided in the power feeding connector and blasts air to prevent the power feeding plug from becoming wet; a reflux chamber provided in the power receiving connector to circulate the air blasted through the air nozzle toward the attachment port; an air supply source provided in the charging device to supply the air to the air nozzle; a controller provided in the charging device to control the air supply source; and an operation switch that is provided in the power feeding connector and operated when the power feeding connector is attached to the power receiving connector, wherein the controller controls the air supply source to halt supply of the air on the basis of an operation of the operation switch.

In the charging structure according to the present invention, the power receiving connector includes an operation wall that operates the operation switch during attachment of the power feeding connector.

In the charging structure according to the present invention, the power receiving connector includes, in addition to the attachment port, a communicating hole through which the reflux chamber communicates with the outside.

In the charging structure according to the present invention, the controller causes the air supply source to perform a suction operation after halting a blasting operation of the air supply source.

In the charging device according to the present invention, the air nozzle for preventing the power feeding plug from becoming wet by blasting air is provided in the power feeding connector, the operation switch operated when the power feeding connector is removed from the connector holding portion is provided between the power feeding connector and the connector holding portion, and the air supply source is activated by the controller on the basis of an operation of the operation switch. Hence, the power feeding plug of the power feeding connector can be prevented from becoming wet while the power feeding connector is attached to the power receiving connector of the vehicle after being removed from the connector holding portion. Accordingly, the waterproofing reliability (weather resistance) of the charging device can be improved, and as a result, short-circuits and associated problems can be prevented reliably even when the charging device is used in an outdoor location without a roof or the like.

In the charging device according to the present invention, the air supply source is housed in the main body portion, and therefore the outer appearance of the charging device can be improved. Moreover, the outer appearance of the charging device can be made uncluttered, and therefore vandalism to the charging device can be prevented.

In the charging device according to the present invention, the air nozzle is provided between the plus terminal and the minus terminal forming the power feeding plug so as to blast air radially in an orthogonal direction to the axial direction of the power feeding plug, and therefore the air nozzle can blow away rainwater and the like falling toward the power feeding plug, thereby preventing the power feeding plug from becoming wet.

In the charging device according to the present invention, at least one air nozzle is provided on the outer side of the power feeding plug, and the air nozzle forms an air curtain that covers the power feeding plug. Therefore, rainwater and the like falling toward the power feeding plug can be blocked by the air curtain, and as a result, the power feeding plug can be prevented from becoming wet.

The charging structure according to the present invention includes the power receiving connector and the power feeding connector, the air nozzle for preventing the power feeding plug from becoming wet by blasting air is provided in the power feeding connector, the reflux chamber for circulating the air blasted through the air nozzle toward the attachment port of the power receiving connector is provided in the power receiving connector, the operation switch operated when the power feeding connector is attached to the power receiving connector is provided in the power feeding connector, and the air supply is stopped by the controller on the basis of an operation of the operation switch. Therefore, the power feeding plug of the power feeding connector can be prevented from becoming wet while the power feeding connector is attached to the power receiving connector. Further, rainwater or the like adhered to the power receiving plug of the power receiving connector can be blown away by the air blasted through the air nozzle, and therefore the power feeding plug can be electrically connected to the power receiving plug reliably. As a result, waterproofing reliability can be improved, whereby short-circuits and associated problems can be prevented reliably.

In the charging structure according to the present invention, the power receiving connector includes the operation wall for operating the operation switch during attachment of the power feeding connector, and therefore air can be blasted while the power feeding connector is attached to the power receiving connector. As a result, rainwater or the like adhered to the power feeding plug and the power receiving plug can be blown away even more reliably.

In the charging structure according to the present invention, the power receiving connector includes, in addition to the attachment port, the communicating hole through which the reflux chamber communicates with the outside, and therefore an increase in an internal pressure of the power receiving connector can be suppressed. Accordingly, an increase in an attachment load for attaching the connectors can be suppressed. Moreover, when rainwater or the like exists in the power receiving connector, the rainwater can be discharged to the outside through the communicating hole.

In the charging structure according to the present invention, the controller causes the air supply source to perform a suction operation after halting the blasting operation of the air supply source, and therefore the respective interiors of the power feeding connector and the power receiving connector can be set at a negative pressure. This negative pressure can be used to hold and support the connectors during attachment, thereby facilitating attachment of the connectors and preventing the power feeding connector from dropping out of the power receiving connector during charging.

BRIEF DESCRIPTION OF THE DRAWINGS

FIG. 8 is a table showing "ON" and "OFF" states of respective switches and an operating state of an air compressor and a vacuum pump during a charging operation;

FIGS. 11A and 11B are illustrative views illustrating the structure of a power feeding connector according to a third embodiment;

FIGS. 13A and 13B are illustrative views illustrating the structure of a power feeding connector according to a fifth embodiment.

DESCRIPTION OF THE PREFERRED EMBODIMENTS

A first embodiment of the present invention will be described in detail below using the drawings.

Figure 1A:
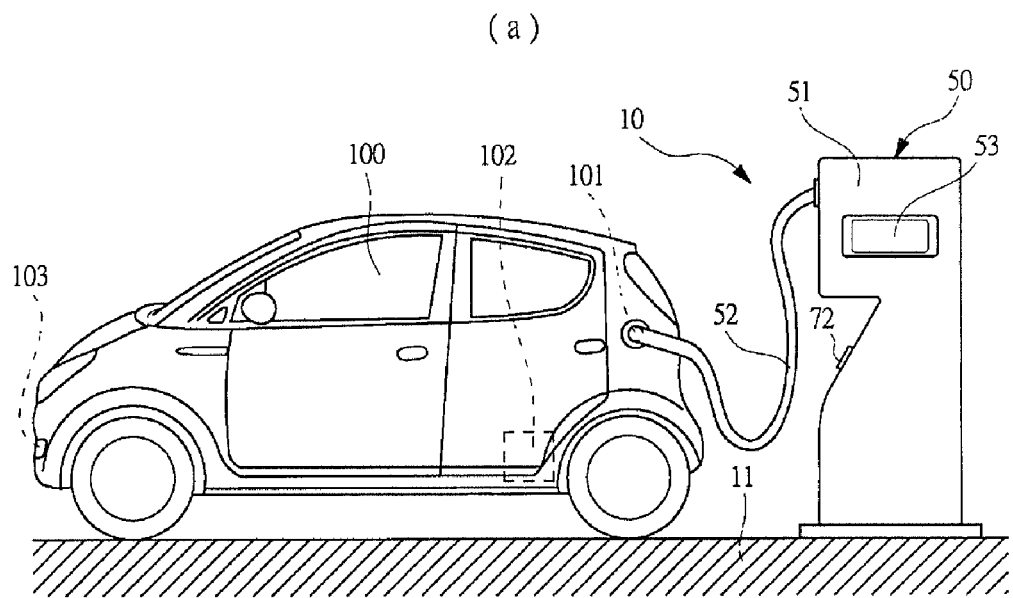
FIGS. 1A and 1B are illustrative views illustrating showing charging patterns of an electric vehicle.
Figure 1B:
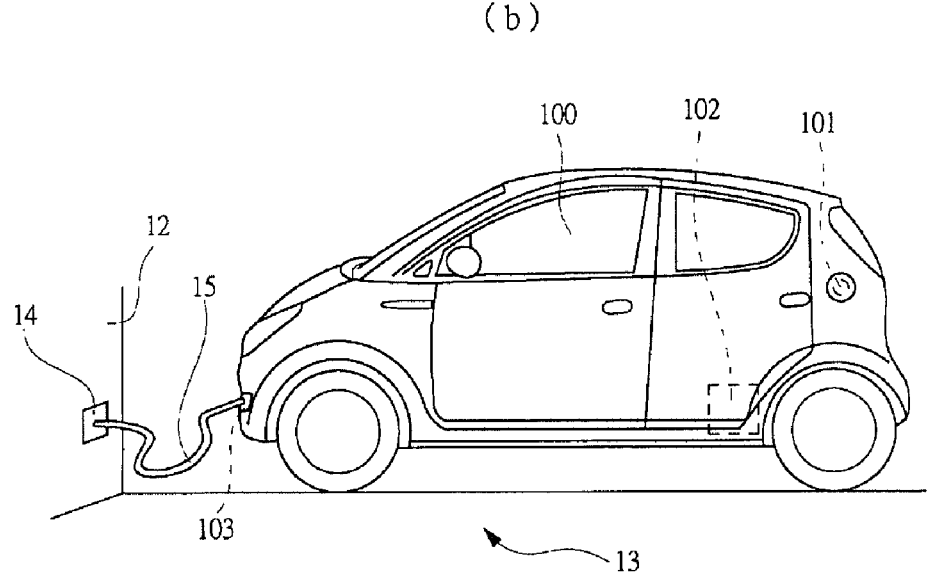
Figure 2:
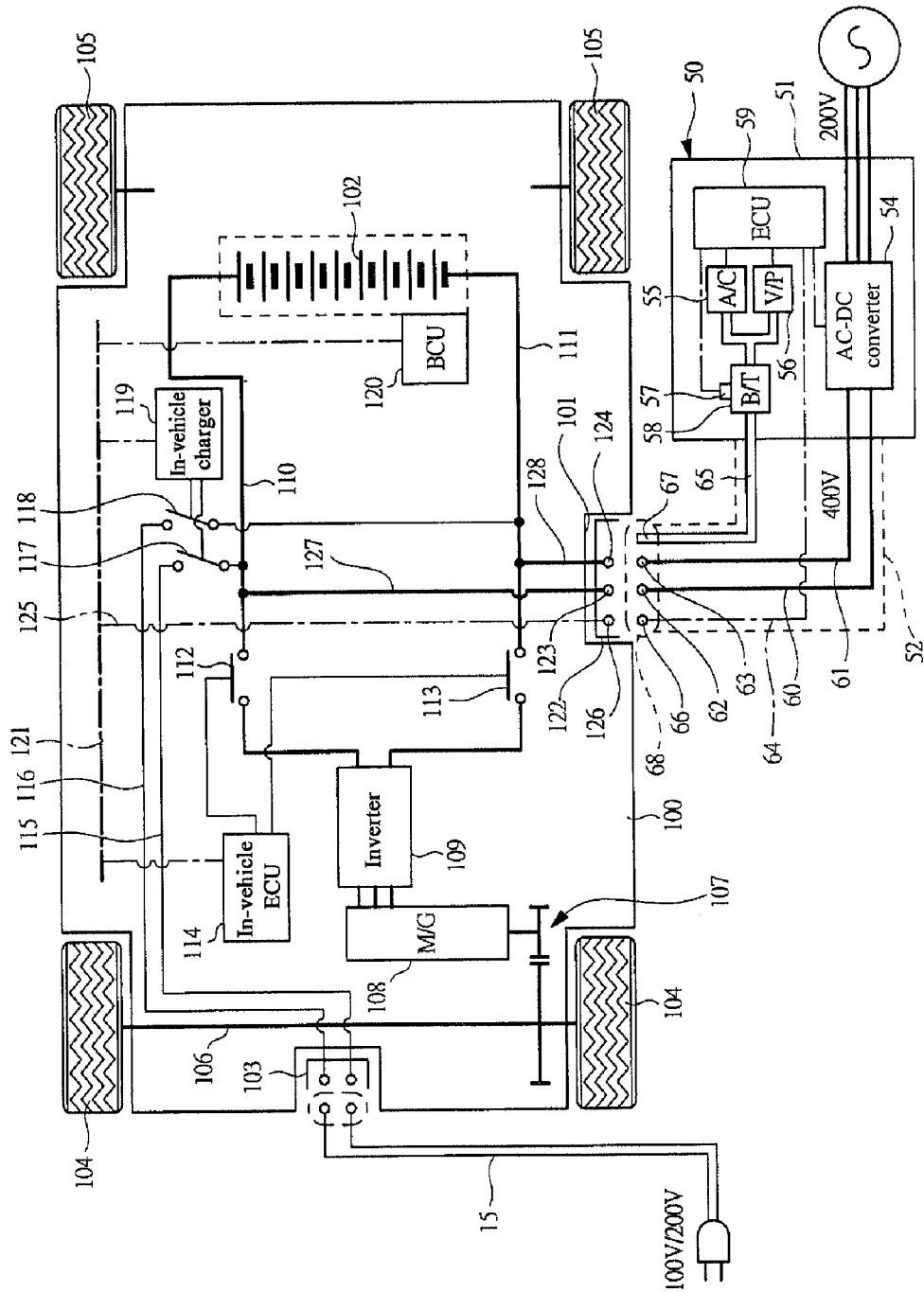
FIG. 2 is a circuit diagram showing the constitution of an electric system of a charging device and an electric vehicle.
Figure 3:
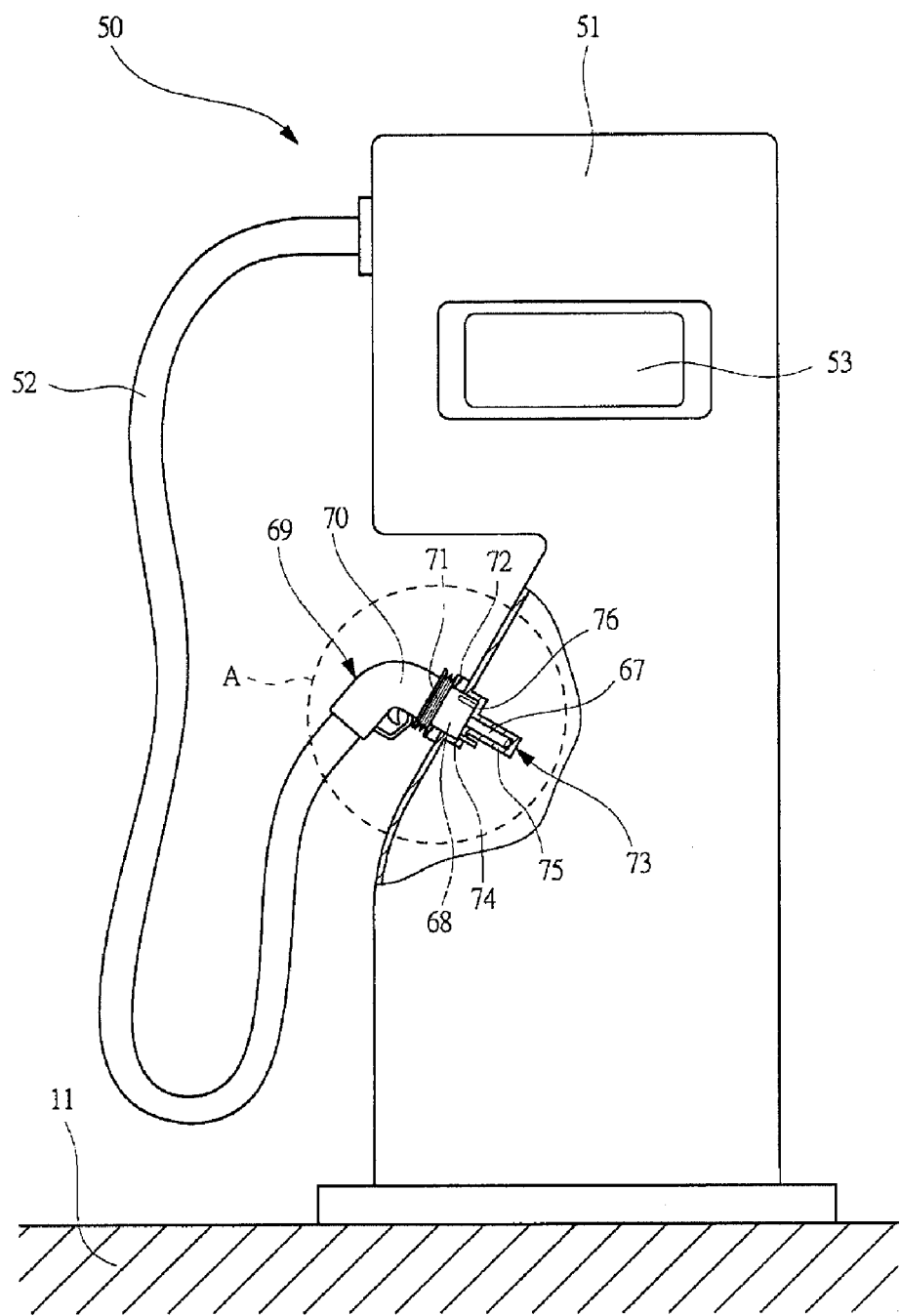
FIG. 3 is an external view showing the exterior of the charging device.
Figure 4A:
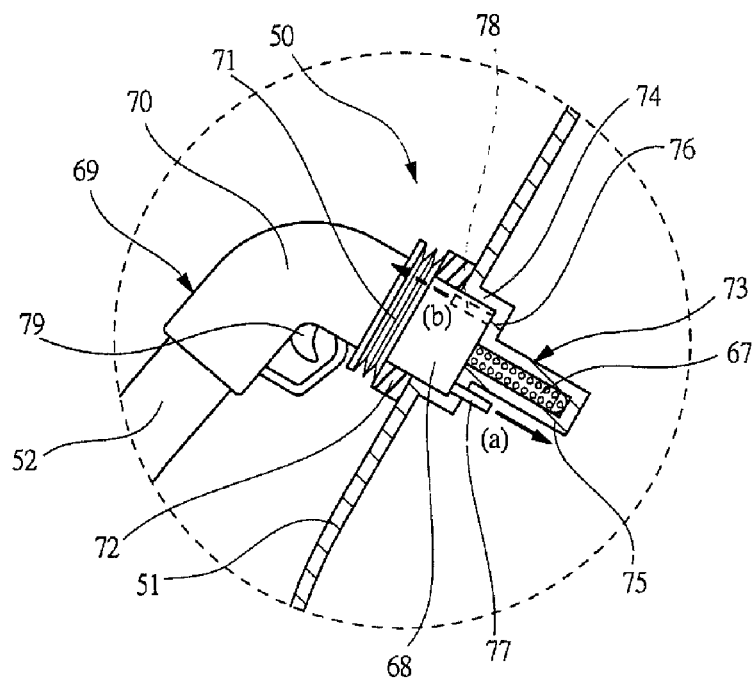
FIGS. 4A and 4B are enlarged sectional views showing enlargements of a part A indicated in FIG. 3 by a broken line circle.
Figure 4B:
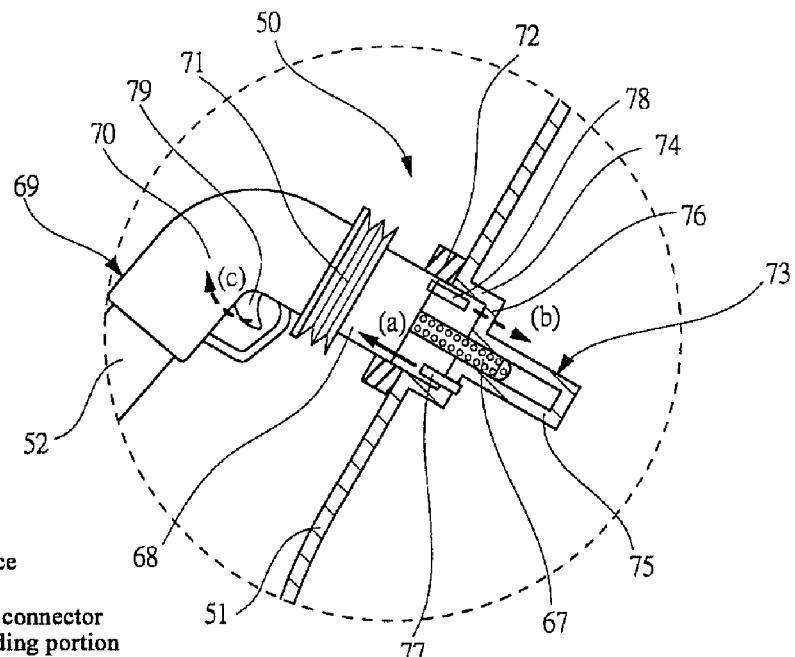
Figure 5:
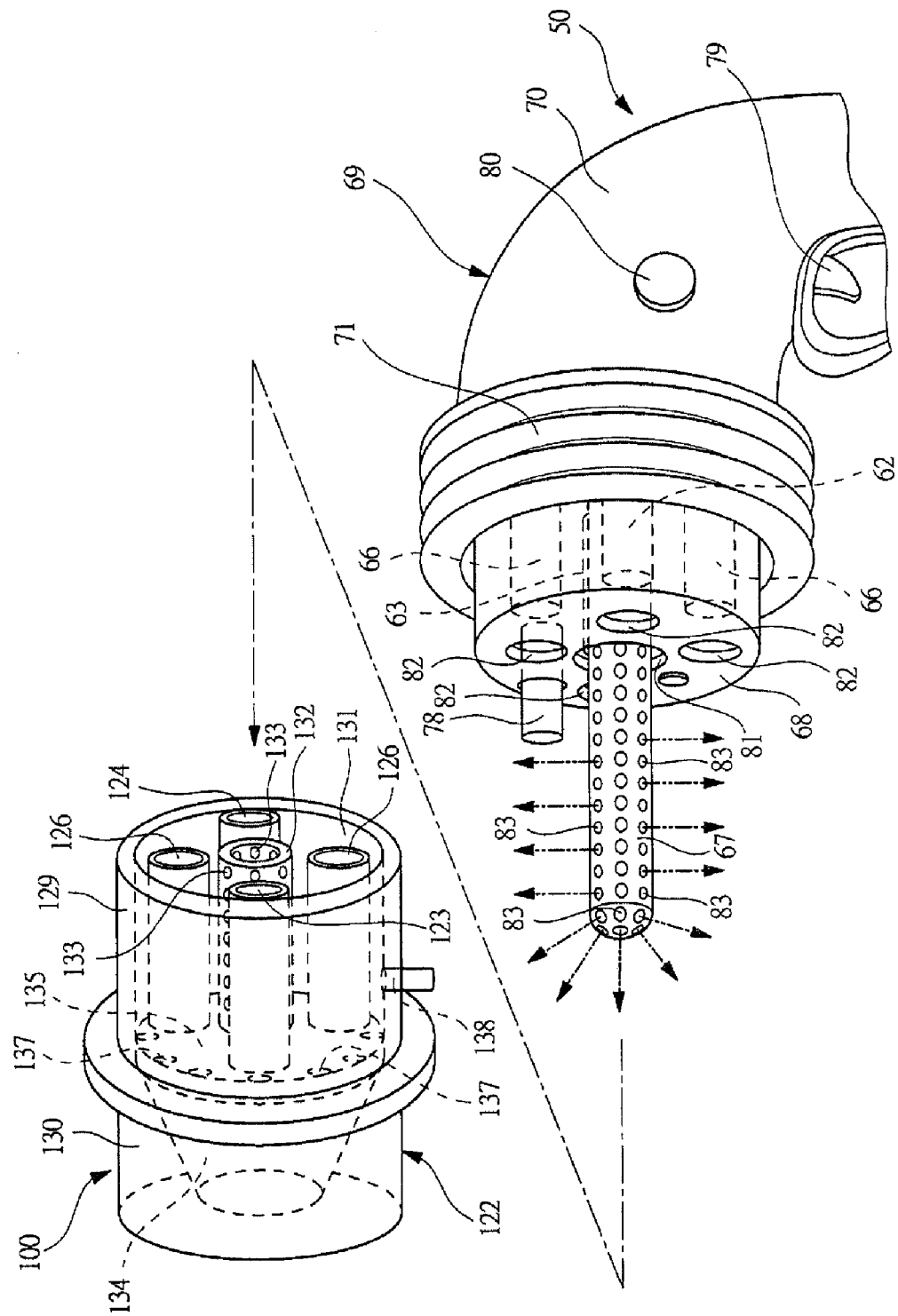
FIG. 5 is a perspective view showing the structure of a power feeding connector and a power receiving connector.
Figure 6:
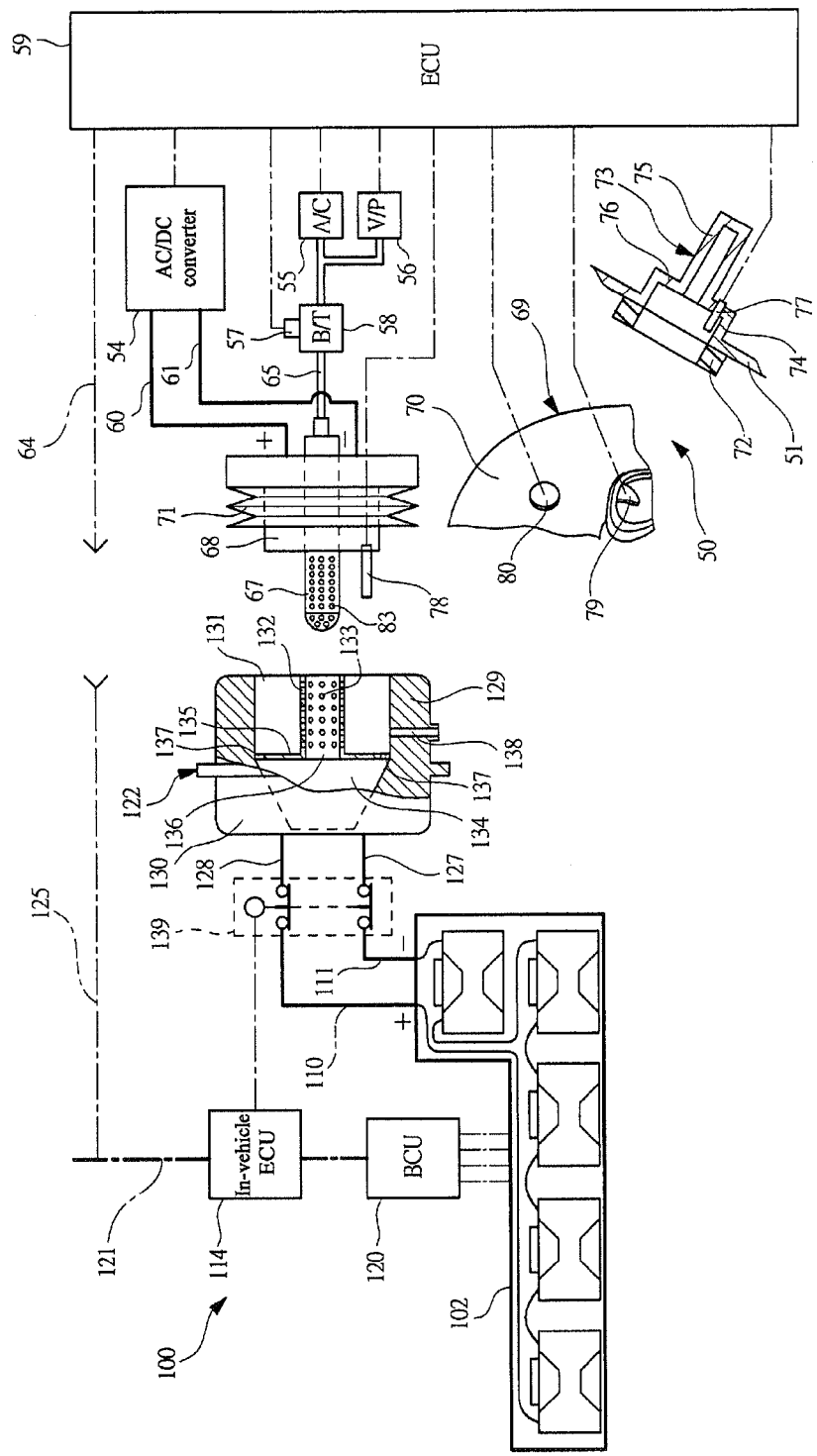
FIG. 6 is a pattern diagram showing a charging structure of the charging device.
Figure 7:
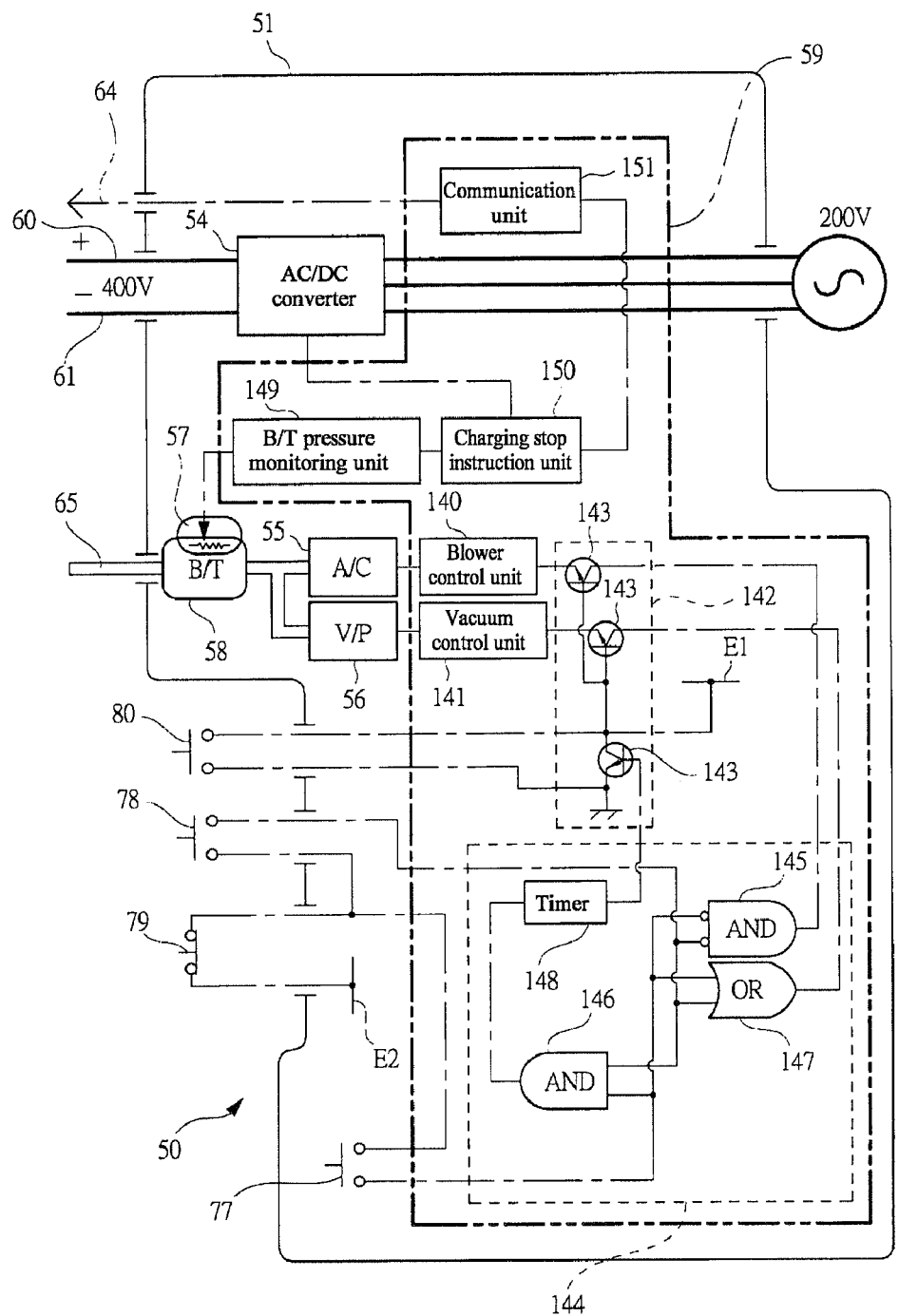
FIG. 7 is an illustrative view illustrating in detail an internal structure of a casing of the charging device.

FIGS. 1A and 1B are illustrative views illustrating charging patterns of an electric vehicle. FIG. 2 is a circuit diagram showing the constitution of an electric system of a charging device and an electric vehicle. FIG. 3 is an external view showing the exterior of the charging device. FIGS. 4A and 4B are enlarged sectional views showing enlargements of a part A indicated in FIG. 3 by a broken line circle. FIG. 5 is a perspective view showing the structure of a power feeding connector and a power receiving connector. FIG. 6 is a pattern diagram showing a charging structure of the charging device. FIG. 7 is an illustrative view illustrating in detail an internal structure of a casing of the charging device.

FIG. 1A shows a charging pattern of a rapid charging station 10 annexed to an outdoor parking lot (not shown) of a large retail store or the like, in which a plurality of charging devices 50 (only one of which is shown in the drawing) are disposed at the rapid charging station 10. The charging device 50 includes a hollow box-shaped casing (main body portion) 51, and the casing 51 is fixed to a ground surface 11 via a fixing member such as an anchor bolt (not shown). The charging device 50 includes a flexible charging cable 52, one end side of which is connected to the casing 51 and another end side of which can be connected to a power receiving port 101 provided on a rear side (the right side in the drawing) of an electric vehicle 100.

A high voltage battery 102 serving as a secondary battery is installed under a rear seat (not shown) or the like of the electric vehicle 100, and the high voltage battery 102 can be charged by the charging device 50 via the power receiving port 101 and the charging cable 52. Note that the charging device 50 exhibits a charging capability of approximately 65% in five minutes (400 V) and approximately 80% in fifteen minutes (400 V), for example, and a state of charge of the high voltage battery 102 is displayed on a display 53 provided on a side face of the casing 51.

FIG. 1B shows a charging pattern of a household commercial power supply 14 provided on a wall or the like near a parking space 13 of a house 12. In this pattern, one end side of a charging cable 15 can be inserted into the household commercial power supply 14, and another end side of the charging cable 15 is connected to a charging socket 103 provided on a front side (the left side in the drawing) of the electric vehicle 100. Thus, the high voltage battery 102 can be charged by the household commercial power supply 14 via the charging cable 15 and the charging socket 103. Note that the household commercial power supply 14 has a lower voltage (100 V/200 V) than the charging device 50 shown in FIG. 1A and therefore exhibits a charging capability of approximately 100% in eight hours (100 V) or five hours (200 V), for example.

Hence, the high voltage battery 102 of the electric vehicle 100 can be charged in two ways using the charging device 50, which serves as an external power supply, and the household commercial power supply 14. Note that the electric vehicle 100 is installed with a motor-generator (M-G) 108 (see FIG. 2) that functions as a drive source during vehicle acceleration and a power generator during vehicle braking, and the high voltage battery 102 can also be charged by the motor-generator 108.

As shown in FIG. 2, the electric vehicle 100 includes a pair of front wheels 104 and a pair of rear wheels 105. The front wheels 104 serve as drive wheels, and the motor-generator 108 is coupled to a drive shaft 106 driving the front wheels 104 via a gear train 107 having a fixed reduction ratio. Hence, the electric vehicle 100 is a front-wheel drive vehicle in which the front wheels 104 are driven by the motor-generator 108.

The motor-generator 108 is constituted by a three-phase synchronous motor, and the high voltage battery 102 is connected to the motor-generator 108. Here, a lithium ion battery is employed as the high voltage battery 102, and the high voltage battery 102 outputs 400 V of power, for example.

An inverter 109 is provided between the motor-generator 108 and the high voltage battery 102, and the inverter 109 is connected to the high voltage battery 102 via a pair of first power cables 110 and 111. The inverter 109 converts a direct current from the high voltage battery 102 into a three-phase alternating current and supplies power to the motor-generator 108. Further, during vehicle braking, the motor-generator 108 converts kinetic energy into electric energy and supplies power to the high voltage battery 102 via the inverter 109. Hence, a driving current for driving the motor-generator 108 and a charging current for charging the high voltage battery 102 pass between the motor-generator 108 and the high voltage battery 102.

A pair of main relays 112 and 113 for switching the high voltage battery 102 and the inverter 109 between a connected state and a disconnected state are provided midway between the respective first power cables 110 and 111. The main relays 112 and 113 are switched to the connected state or the disconnected state in response to a drive signal from an in-vehicle ECU 114.

A pair of second power cables 115 and 116 are provided between the charging socket 103 on the front side (the left side in the drawing) of the electric vehicle 100 and the first power cables 110 and 111. A pair of switches 117 and 118 are provided midway between the respective second power cables 115 and 116, and an in-vehicle charger 119 is connected to the pair of switches 117 and 118. When the high voltage battery 102 is charged using the household commercial power supply 14 (see FIG. 1B), the in-vehicle charger 119 is activated to drive the switches 117 and 118 and boost the voltage (100 V/200 V) of the household commercial power supply 14 such that the voltage of the household commercial power supply 14 is converted into a 400 V direct current.

A battery control unit (BCU) 120 is connected to the high voltage battery 102 to monitor and manage a charge-discharge state and so on of the high voltage battery 102. The BCU 120, in-vehicle charger 119, and in-vehicle ECU 114 are respectively connected to a communication network (CAN) 121 to be capable of communicating information to each other via the communication network 121. For example, information indicating the state of charge (SOC) of the high voltage battery 102 is transmitted to the in-vehicle ECU 114 via the communication network 121. Note that the in-vehicle ECU 114 and the BCU 120 include a CPU for calculating control signals, a ROM for storing control programs, calculation equations, map data, and so on, and a RAM for storing data temporarily.

A power receiving connector 122 is provided in the power receiving port 101 of the electric vehicle 100. A power-receiving-side plus terminal 123 and a power-receiving-side minus terminal 124, which together serve as a power receiving plug, are fixed to the power receiving connector 122 together with a power-receiving-side communication terminal 126 that is connected to the communication network 121 via a vehicle-side-communication line 125. The power-receiving-side plus terminal 123 is connected to the high voltage battery 102 via a plus side cable 127 and one of the first power cables 110. The power-receiving-side minus terminal 124 is connected to the high voltage battery 102 via a minus side cable 128 and the other first power cable 111.

Although not shown in FIG. 2, a high voltage battery control relay (see FIG. 6) driven by the in-vehicle ECU 114 is provided between the respective first power cables 110 and 111 and the plus and minus side cables 127 and 128. The high voltage battery control relay serves as a safety device for interrupting a charging operation by the charging device 50 in cases where a connection between the power receiving side and power feeding side terminals is unstable and so on.

The charging device 50 includes the casing 51 and the charging cable 52, and an AC-DC converter 54, an air compressor (A/C) 55, a vacuum pump (V/P) 56, a buffer tank (B/T) 58 having a pressure sensor 57, and an ECU (controller) 59 are housed in the interior of the casing 51. By housing the air compressor 55, the vacuum pump 56, and so on in the interior of the casing 51 in this manner, the outer appearance of the charging device 50 is made uncluttered and pleasing to the eye. As a result, vandalism to the charging device 50, which is often disposed outdoors, can be prevented.

The AC-DC converter 54, which serves as a power converter, is controlled on the basis of a control signal from the ECU 59 to convert and boost a 200 V alternating current supplied from the outside (a commercial power supply or the like) to a 400 V direct current. The air compressor 55, which serves as an air supply source, is controlled on the basis of a control signal from the ECU 59 to blast air toward the buffer tank 58. The vacuum pump 56, which serves as an air supply source, is controlled on the basis of a control signal from the ECU 59 to suction air from the buffer tank 58 and discharge the air to the outside. The pressure sensor 57 detects an internal pressure of the buffer tank 58 and transmits the detected pressure to the ECU 59 in the form of a pressure signal. The ECU 59 performs predetermined calculation processing in accordance with the pressure signal from the pressure sensor 57 and so on, and subjects the air compressor 55, the vacuum pump 56, and so on to drive control or stop control.

A pair of current carrying cables 60 and 61 are provided in the interior of the charging cable 52, and one end side of the current carrying cable 60 and 61 is connected to the AC-DC converter 54. A power-feeding-side plus terminal 62 and a power-feeding-side minus terminal 63, which together serve as a power feeding plug, are fixed to the other end side of the current carrying cables 60 and 61, respectively, such that 400 V direct current flows through the current carrying cables 60 and 61 to the power-feeding-side plus terminal 62 and the power-feeding-side minus terminal 63.

Further, a device side communication line 64 and an air duct 65 are provided in the interior of the charging cable 52 in alignment with the current carrying cables 60 and 61. One end side of the device side communication line 64 is connected to the ECU 59, and a power-feeding-side communication terminal 66 is fixed to the other end side of the device side communication line 64. The power-feeding-side communication terminal 66 can be connected to the power-receiving-side communication terminal 126, and by connecting the power-feeding-side communication terminal 66 to the power receiving-side communication terminal 126, information communication is permitted between the ECU 59 and the in-vehicle ECU 114.

One end side of the air duct 65 is connected to the air compressor 55 and the vacuum pump 56 via the buffer tank 58 such that air from the buffer tank 58 flows through the interior of the air duct 65. An air nozzle 67 for blasting the air flowing through the air duct 65 is provided on the other end side of the air duct 65 to blast air toward the power-feeding-side communication terminal 66, the power-feeding-side plus terminal 62, the power-feeding-side minus terminal 63, and so on.

The power-feeding-side communication terminal 66, the power-feeding-side plus terminal 62, the power-feeding-side minus terminal 63, and the air nozzle 67 are respectively fixed to a power feeding connector 68 provided on the other end side of the charging cable 52 in a predetermined arrangement. The power feeding connector 68 can be attached to the power receiving connector 122 in a positioned state. By attaching the power feeding connector 68 to the power receiving connector 122, the power-feeding-side communication terminal 66, the power-feeding-side plus terminal 62, and the power-feeding-side minus terminal 63 are aligned with the power-receiving-side communication terminal 126, the power-receiving-side plus terminal 123, and the power-receiving-side minus terminal 124, respectively, and as a result, the respective terminals can be connected to each other accurately.

As shown in FIG. 3, a power feeding gun 69 is provided on the other end side of the charging cable 52 forming the charging device 50, and the power feeding gun 69 includes the air nozzle 67, the power feeding connector 68, and a grip portion 70. The grip portion 70 is bent at a substantially 90 degree angle so that when an operator grips the grip portion 70, the power feeding connector 68 can be easily moved to the power receiving port 101 (see FIGS. 1A and 1B) of the electric vehicle 100. Further, a bellows member 71 formed from an elastic material such as rubber is provided between the power feeding connector 68 and the grip portion 70, and the bellows member 71 is capable of contacting a ring-shaped cushion 72 provided on the casing 51 in an airtight condition.

A connector holding portion 73 for holding the power feeding connector 68 detachably is provided on a side face of the casing 51 forming the charging device 50, and the connector holding portion 73 is formed in a stepped tubular shape. The connector holding portion 73 includes a large diameter tube portion 74, a small diameter tube portion 75, and a step portion 76. The power feeding connector 68 is fitted into the large diameter tube portion 74 and the air nozzle 67 is fitted into the small diameter tube portion 75. Here, the ring-shaped cushion 72 is formed from an elastic material such as rubber, similarly to the bellows member 71, and provided so as to surround an inlet part of the large diameter tube portion 79.

Figure 9A:
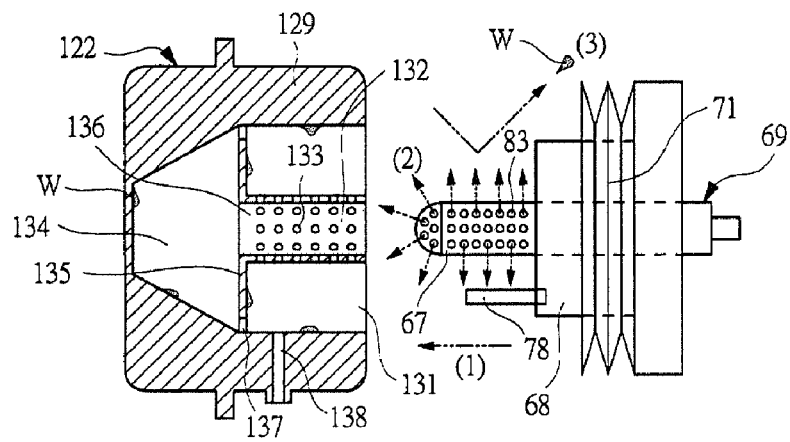
FIGS. 9A, 9B and 9C are illustrative views illustrating an attachment state between the power feeding connector and the power receiving connector.
Figure 9B:
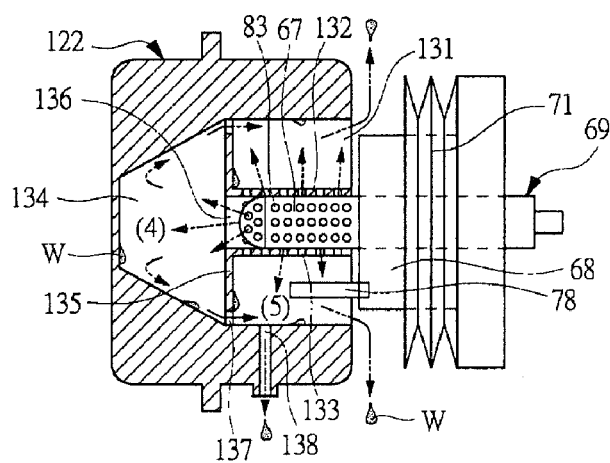

As shown in FIGS. 4A and 9B, a first fitting switch 77 is provided on the step portion 76 of the connector holding portion 73, and the first fitting switch 77 is connected to the ECU 59 (see FIGS. 6 and 7) of the charging device 50. As shown by a solid line arrow (a) in FIG. 4A, when the power feeding connector 68 is fitted into the large diameter tube portion 79, the first fitting switch 77 is pressed and operated by the power feeding connector 68. More specifically, the first fitting switch 77 is provided between the power feeding connector 68 and the connector holding portion 73 to form an operation switch that is operated by removing the power feeding connector 68 from the large diameter tube portion 74. The first fitting switch 77 is turned "ON" when moved in the direction of the solid line arrow (a) in FIG. 4A and turned "OFF" when moved in the direction of a solid line arrow (a) in FIG. 9B. Hence, the first fitting switch 77 is a normally OFF operation switch.

A second fitting switch 78 is provided on the power feeding connector 68, and the second fitting switch 78 is connected to the ECU 59 of the charging device 50. As shown by a broken line arrow (b) in FIG. 4A, when the power feeding connector 68 is fitted into the large diameter tube portion 74, the second fitting switch 78 is pressed and operated by the step portion 76. More specifically, the second fitting switch 78 is provided between the power feeding connector 68 and the connector holding portion 73 to form an operation switch that is operated by removing the power feeding connector 68 from the large diameter tube portion 74. The second fitting switch 78 is turned "ON" when moved in the direction of the broken line arrow (b) in FIG. 4A and turned "OFF" when moved in the direction of a broken line arrow (b) in FIG. 4B. Hence, the second fitting switch 78 is a normally OFF operation switch.

A release switch 79 operated by a finger of the operator or the like is provided on the grip portion 70 of the power feeding gun 69, and the release switch 79 is connected to the ECU 59 of the charging device 50. The release switch 79 is operated as shown by a dot-dash line arrow (c) in FIG. 4B when the power feeding connector 68 is removed from the large diameter tube portion 74 and when the power feeding connector 68 is removed from the power receiving connector 122 of the electric automobile 100. The release switch 79 is "ON" when inoperative and "OFF" when operative, and, therefore the release switch 79 is a normally ON operation switch.

As shown in FIG. 5, a forcible blower stop switch 80 pressed and operated by the operator is provided on the grip portion 70 of the power feeding gun 69, and the forcible blower stop switch 80 is connected to the ECU 59 (see FIGS. 6 and 7) of the charging device 50. The forcible blower stop switch 80 is operated to stop air blasting from the air nozzle 67 (chain double-dashed line arrows in the drawing) during an emergency. The forcible blower stop switch 80 is "OFF" when inoperative and "ON" when operative, and therefore the forcible blower stop switch 80 is a normally OFF operation switch.

The power feeding connector 68 is formed in a closed-end tube shape, and a pair of power-feeding-side communication terminals 66, the power-feeding-side plus terminal 62, the power feeding-side minus terminal 63, and a base end side of the air nozzle 67 are fixed to the inside of the power feeding connector 68. A part (a left side part in the drawing) of the air nozzle 67 extending from an axial-direction substantially-central part to an axial-direction tip-end part extends outside through a central hole 81 provided in a bottom portion of the power feeding connector 68, while the other terminals 66, 62 and 63 are housed in the interior of the power feeding connector 68.

Axial-direction tip-end parts of the respective terminals 66, 62 and 63 oppose a plurality of insertion ports 82 provided in the power feeding connector 68. When the power feeding connector 68 is attached to the power receiving connector 122, as shown by a dot-dash line arrow in the drawing, a pair of power-receiving-side communication terminals 126, the power-receiving-side plus terminal 123, and the power-receiving-side minus terminal 124 fixed to the power receiving connector 122 are inserted respectively into the corresponding insertion ports 82.

The air nozzle 67 is provided in the middle of (in a central part of) the terminals 66, 62 and 63, and a plurality of communicating holes 83 through which the inside and outside thereof communicate with each other are provided in the air nozzle 67. A large number of communicating holes 83 are provided in the axial direction and circumferential direction of the air nozzle 67 such that air from the air nozzle 67 is blasted radially about the air nozzle 67 in an orthogonal direction to the axial direction of the respective terminals 66, 62 and 63, as shown by chain double-dashed line arrows in the drawing. Thus, rainwater and the like can be prevented from soaking the terminals 66, 62, 63, and so on.

The power receiving connector 122 is formed in a hollow cylindrical shape, and includes a first tube portion 129 on the charging device 50 side (the right side in the drawing) and a second tube portion 130 on the electric vehicle 100 side (the left side in the drawing). An attachment port 131 is provided on the charging device 50 side of the first tube portion 129 to provide guidance when the power feeding connector 68 is attached to the power receiving connector 122.

The pair of power-receiving-side communication terminals 126, the power-receiving-side plus terminal 123, the power-receiving-side minus terminal 124, and a base end side of a nozzle guide 132 are fixed to the inside of the first tube portion 129. The air nozzle 67 is capable of sliding inside the nozzle guide 132, and thus the nozzle guide 132 provides guidance together with the attachment port 131 when the power feeding connector 68 is attached to the power receiving connector 122.

Similarly to the air nozzle 67, the nozzle guide 132 is provided with a plurality of communicating holes 133 connecting the inside thereof to the outside. The number of communicating holes 133 is set to be substantially identical to the number of communicating holes 83 in the air nozzle 67 so that the respective communicating holes 133 can oppose the communicating holes 83. A length dimension of the nozzle guide 132 is set to be substantially identical to length dimensions of the respective terminals 126, 123 and 124 such that when the power feeding connector 68 is attached to the power receiving connector 122, a tip end side (the right side in the drawing) of the nozzle guide 132 is inserted into the central hole 81 provided in the power feeding connector 68.

A substantially-truncated-cone-shaped reflux chamber 134 that gradually decreases in diameter toward the electric vehicle 100 side is provided inside the second tube portion 130. An operation wall 135 is provided between the reflux chamber 134 and the inside of the first tube portion 129 to partition the two, and when the power feeding connector 68 is attached to the power receiving connector 122, the operation wall 135 presses and operates the second fitting switch 78 provided on the power feeding connector 68.

As shown in FIG. 6, an entrance hole 136 that allows the axial-direction tip-end part of the air nozzle 67 to enter the reflux chamber 134 is provided in a central part of the operation wall 135, and a plurality of first air communicating passages 137 for making the reflux chamber 134 communicate with the inside of the first tube portion 129 are provided on a diametrical-direction outer side of the operation wall 135. The first air communicating passages 137 are disposed at equal intervals in a circumferential direction of the operation wall 135. Further, in addition to the attachment port 131, a second air communicating passage 138 is provided in the first tube portion 129 as a communicating hole. The second air communicating passage 138 is provided on the operation wall 135 side of the first tube portion 129 to make the reflux chamber 134 communicate with the outside. Thus, air blasted from the axial-direction tip-end part of the air nozzle 67 is turned back in the reflux chamber 134 by the reflux chamber 134 so as to pass through the first air communicating passages 137 and flow back toward the attachment port 131. A part of the air that passes through the first air communicating passages 137 is discharged to the outside through the second air communicating passage 138.

FIG. 6 does not show the respective power-receiving-side terminals 126, 123 and 124 and the respective power-feeding-side terminals 66, 62 and 63. On the other hand, the high voltage battery control relay (safety device) omitted from FIG. 2 is shown in FIG. 6. A circuit configuration of the electric vehicle 100 and the charging device 50 will now be described using FIGS. 6 and 7.

As shown in FIG. 6, a high voltage battery control relay 139 is connected to the in-vehicle ECU 114 and provided between the first power cables 110 and 111 and the plus side cable 127 and minus side cable 128. The in-vehicle ECU 114 detects instability in the electric connections between the power-receiving-side terminals 123 and 124 and the power-feeding-side terminals 62 and 63 (i.e. detects contact defects between the terminals and so on) and drives the high voltage battery control relay 139. Hence, when a contact defect or the like occurs between the terminals, the high voltage battery control relay 139 is turned "OFF," and as a result, charging by the charging device 50 is stopped (i.e. the safety device is activated).

As shown in FIG. 7, the ECU 59 of the charging device 50 is provided with a blower control unit 140 and a vacuum control unit 141, and the respective control units 140 and 141 generate drive currents for driving the air compressor 55 and the vacuum pump 56, respectively. A drive circuit 142 is connected to the control units 140 and 141, and the drive circuit 142 transmits drive signals to the control units 140 and 141 to drive either one of the air compressor 55 and the vacuum pump 56 or stop both.

The forcible blower stop switch 80 of the power feeding gun 69 and a power supply E1 for generating an H (High) signal are connected to the drive circuit 142. An H signal is input into the drive circuit 142 via the power supply E1 when the forcible blower stop switch 80 is "ON," whereby both the air compressor 55 and the vacuum pump 56 are stopped. Here, the drive circuit 142 is formed from a plurality of npn type transistors 143 (three are shown in the drawing).

The ECU 59 is provided with a control circuit 144, and the first fitting switch 77 of the connector holding portion 73, the second fitting switch 78 of the power feeding connector 68, and the release switch 79 of the power feeding gun 69 are connected to the control circuit 144. Further, a power supply E2 for generating an H signal is connected to the release switch 79. On the basis of the "ON" and "OFF" states of the respective switches 77, 78 and 79, the control circuit 144 generates control signals for the air compressor 55 and the vacuum pump 56 and transmits these control signals to the drive circuit 142. Here, the control circuit 144 is formed from a first AND circuit 145, a second AND circuit 146, an OR circuit 147, and a timer 148.

The ECU 59 further includes a B/T pressure monitoring unit 149, a charging stop instruction unit 150, and a communication unit 151. The B/T pressure monitoring unit 149 is connected to the pressure sensor 57 provided in the buffer tank 58 to monitor the internal pressure of the buffer tank 58. A monitoring state (pressure signal) is input into the charging stop instruction unit 150 from the B/T pressure monitoring unit 149, and when the internal pressure of the buffer tank 58 does not equal a predetermined value (is outside a predetermined range), the charging stop instruction unit 150 stops the AC-DC converter 54 to halt charging of the high voltage battery 102.

The communication unit 151 exchanges information with the in-vehicle ECU 114 via the device-side communication line 64 and the vehicle-side communication line 125. For example, the communication unit 151 receives information indicating the state of charge of the high voltage battery 102 or the like from the in-vehicle ECU 114, and when charging of the high voltage battery 102 is complete, the communication unit 151 transmits a charging completion signal to the charging stop instruction unit 150. On the basis of input of the charging completion signal, the charging stop instruction unit 150 stops the AC-DC converter 54.

Next, operations of the charging structure formed as described above, including the charging device 50 and the electric vehicle 100 side, will be described in sequence with reference to Charging Operations 1 to 9 shown in FIG. 8.

Figure 9C:
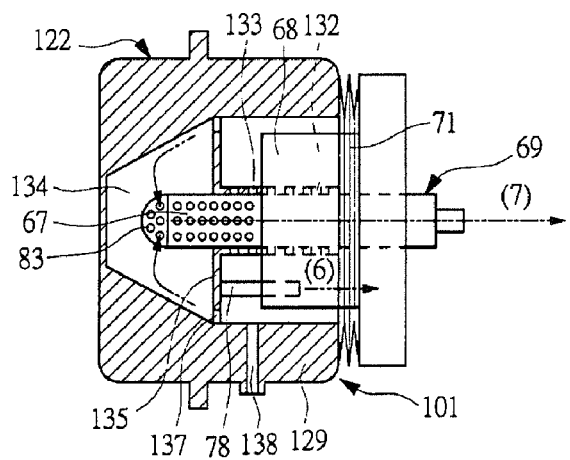

FIG. 8 is a table showing "ON" and "OFF" states of the respective switches and the operating state of the air compressor and the vacuum pump during a charging operation. FIGS. 9A, 9B and 9C are illustrative views illustrating an attachment state between the power feeding connector and the power receiving connector.

[Charging Operation 1]

To charge the high voltage battery 102, first, the electric vehicle 100 is stopped near the charging device 50. The operator then operates the charging device 50 or the like such that the charging device 50 enters charging standby. At this time, as shown in FIG. 4A, the power feeding gun 69 is attached to the charging device 50 and the power feeding connector 68 is attached to the connector holding portion 73. Further, the power feeding gun 69 has not yet been operated by the operator, and therefore the first fitting switch 77, second fitting switch 78, and release switch 79 are all in an "ON" state.

Since the fitting switches 77 and 78 and the release switch 79 are all "ON," an H signal is input into the control circuit 144 via the respective fitting switches 77 and 78. Accordingly, an H signal is output from the first AND circuit 145 and an L (Low) signal is output from the OR circuit 147. Further, an H signal is output from the second AND circuit 146 and input into the drive circuit 142 via the timer 148. At this time, H signals are input to the drive circuit 142 respectively from the first AND circuit 145 and the second AND circuit 146, but the drive circuit 142 turns both the air compressor 55 and the vacuum pump 56 "OFF" on the basis of the H signal from the second AND circuit 146. Note that during Charging Operation 1, the timer 148 is "OFF."

[Charging Operation 2]

When the operator operates the release switch 79 to turn the release switch 79 "OFF," the air compressor 55 is activated such that a blower operation (blasting operation) state is entered. Accordingly, air is blasted through the communicating holes 83 in the air nozzle 67 toward the small diameter tube portion 75 of the connector holding portion 73. As a result, the internal pressure of the connector holding portion 73 including the large diameter tube portion 74 rises, and this pressure assists removal of the power feeding connector 68 from the connector holding portion 73. Therefore, the operator can remove the power feeding gun 69 from the charging device 50 with a small force.

At this time, only the release switch 79 is "OFF," and the first fitting switch 77 and second fitting switch 78 remain "ON". Since the release switch 79 is "OFF," L signals are input into the control circuit 144 via the fitting switches 77 and 78. Accordingly, an H signal is output from the first AND circuit 145 and an L signal is output from the OR circuit 147.

Further, an L signal is output from the second AND circuit 146 and input into the drive circuit 142 via the timer 148. The H signal from the first AND circuit 145, the L signal from the OR circuit 147, and the L signal from the second AND circuit 146 are input into the drive circuit 142, and on the basis of the H signal from the first AND circuit 145, the drive circuit 142 turns the air compressor 55 "ON," or in other words activates a blower operation. Note that during Charging Operation 2, the timer 148 is "OFF."

[Charging Operation 3]

When the power feeding gun 69 is removed from the charging device 50 and moved toward the electric vehicle 100, the first fitting switch 77 and the second fitting switch 78 are switched "OFF" in that order, as shown in FIG. 4B. As a result, air continues to be blasted through the communicating holes 83 in the air nozzle 67 regardless of the "ON" or "OFF" state of the release switch 79 (blower operation).

At this time, both the first fitting switch 77 and the second fitting switch 78 are "OFF," and therefore L signals are input into the control circuit 144 via the respective fitting switches 77 and 78 regardless of the "ON" or "OFF" state of the release switch 79. Accordingly, an H signal from the first AND circuit 145, an L signal from the OR circuit 147, and an L signal from the second AND circuit 146 are input into the drive circuit 142. As a result, the air compressor 55 and the vacuum pump 56 are controlled similarly to Charging Operation 2. Note that during Charging Operation 3, the timer 148 is "OFF."

When the power feeding connector 68 is moved toward the power receiving connector 122, as shown by a chain double-dashed line arrow (1) in FIG. 9A, air is blasted through the communicating holes 83 in the air nozzle 67 in the direction of a chain double-dashed line arrow (2). Therefore, when rainwater W falls toward the power feeding connector 68 on a rainy day or the like, the rainwater W can be blown away in the direction of a chain double-dashed line arrow (3). As a result, the terminals 66, 62 and 63 (see FIG. 5) in the power feeding connector 68 can be prevented from becoming wet.

When the tip end part of the air nozzle 67 is inserted into the nozzle guide 132, as shown in FIG. 9B, air enters the reflux chamber 134 through the entrance hole 136, as shown by a chain double-dashed line arrow (4). When rainwater W exists in the reflux chamber 134 at this time, the rainwater W is moved from the reflux chamber 134 toward the attachment port 131 via the first air communicating passages 137, as shown by a chain double-dashed line arrow (5). The rainwater W moved toward the attachment port 131 is then discharged to the outside through the second air communicating passage 138 and the attachment port 131. Hence, when the power receiving connector 122 is wet, water thereon can be blown away and discharged to the outside by the air blasted through the connecting holes 83 in the air nozzle 67. Thus, moisture in the power receiving connector 122 can be removed at the same time as the power feeding connector 68 is prevented from becoming wet.

Here, the air blasted through the communicating holes 83 in the air nozzle 67 flows through the second air communicating passage 138 even though an opening area of the attachment port 131 decreases when the power feeding connector 68 is attached to the power receiving connector 122. Therefore, an increase in the internal pressure of the reflux chamber 134 can be suppressed, and as a result, an increase in an attachment load for attaching the connectors 68 and 122 can be suppressed.

Further, a part of the air blasted through the communicating holes 83 in the air nozzle 67 passes through the communicating holes 133 in the nozzle guide 132. The communicating holes 83 and 133 are all formed as holes and are therefore aligned and misaligned repeatedly as the air nozzle 67 is inserted into the nozzle guide 132. When the holes 83 and 133 are misaligned, an air film is formed between the air nozzle 67 and the nozzle guide 132, and this air film functions as an air bearing by which the attachment load for attaching the power feeding connector 68 to the power receiving connector 122 can be reduced.

[Charging Operation 4]

When the power feeding connector 68 is inserted further into the power receiving connector 122, the tip end part of the nozzle guide 132 enters the central hole 81 in the power feeding connector 68. During attachment of the power feeding connector 68 to the power receiving connector 122, the second fitting switch 78 is turned "ON" by the operation wall 135 of the power receiving connector 122, as shown by a chain double-dashed line arrow (6) in FIG. 9C. At this time, as shown in FIG. 9C, an end portion of the bellows member 71 of the power feeding gun 69 contacts an end portion of the first tube portion 129 of the power receiving connector 122.

When the operator stops operating the release switch 79 such that the release switch 79 turns "ON," the air compressor 55 is halted such that air is no longer supplied, and instead the vacuum pump 56 is activated such that a vacuum operation (suction operation) state is entered. Accordingly, the air in the reflux chamber 134 is suctioned through the communicating holes 83 in the air nozzle 67 in the direction of a chain double-dashed line arrow (7) such that the internal pressure of the reflux chamber 134 becomes negative, thereby assisting attachment of the power feeding connector 68 to the power receiving connector 122. Further, the bellows member 71 is attached tightly to the first tube portion 129 such that the power feeding connector 68 is adsorbed fixedly to the power receiving connector 122. Hence, the operator can attach the power feeding gun 69 to the power receiving port 101 with a small force, and the terminals on the power receiving side and the power feeding side can be electrically connected to each other reliably.

In cases where contact between the bellows member 71 and the first tube portion 129 is incomplete, a crack forms in the bellows member 71, and so on, the negative pressure in the reflux chamber 134 becomes insufficient. In such cases, it may be impossible to ensure that the terminals on the power receiving side and the power feeding side are electrically connected to each other reliably. Therefore, the pressure sensor 57 detects this state, whereupon the charging operation is stopped and a warning is displayed on the display 53. Further, air flows into the reflux chamber 134 from the outside through the second air communicating passage 138, but an amount of air suctioned by the vacuum pump 56 is larger than an amount of air suctioned through the second communicating passage 138, and therefore the second air communicating passage 138 generates throttle resistance. Accordingly, an attachment assistance force and an adsorption fixing force generated through suction by the vacuum pump 56 do not decrease. Note that the second air communicating passage 138 may be provided with a check valve which allows air to flow from the interior of the power receiving connector 122 to the outside but restricts air flow from the outside into the interior of the power receiving connector 122.

Since the first fitting switch 77 is "OFF" and the second fitting switch 78 and release switch 79 are "ON," an L signal is input into the control circuit 144 via the first fitting switch 77 and an H signal is input into the control circuit 144 via the second fitting switch 78. Accordingly, an L signal is output from the first AND circuit 145 and an H signal is output from the OR circuit 147. Further, an L signal is output from the second AND circuit 146 and input into the drive circuit 142 via the timer 148. The L signal from the first AND circuit 145, the H signal from the OR circuit 147, and the L signal from the second AND circuit 146 are input into the drive circuit 142, and the drive circuit 142 switches the vacuum pump 56 "ON," or in other words activates a vacuum operation, on the basis of the H signal from the OR circuit 147. Note that during Charging Operation 4, the timer 148 is "OFF."

[Charging Operation 5]

The charging device 50 detects that the power feeding gun 69 is attached to the power receiving port 101 (i.e. detects contact between the respective terminals) and starts charging the high voltage battery 102 on the basis of a separate charging control logic (not shown). At this time, the air compressor 55 and the vacuum pump 56 continue to be controlled similarly to Charging Operation 4 such that the power feeding connector 68 remains fixedly adsorbed to the power receiving connector 122. Note that during Charging Operation 5, the timer 148 is "OFF."

[Charging Operation 6]

When charging of the high voltage battery 102 by the charging device 50 is complete and the operator switches the release switch 79 "OFF," air suction is stopped by halting the vacuum pump 56, and instead the air compressor 55 is activated such that the blower operation state is entered. Accordingly, air is blasted into the reflux chamber 134 through the communicating holes 83 in the air nozzle 67. As a result, the internal pressure of the reflux chamber 134 rises such that the fixed adsorption of the power feeding connector 68 to the power receiving connector 122 is released. The blower operation performed by the air compressor 55 then assists in removing the power feeding connector 68 from the power receiving connector 122 so that the operator can remove the power feeding gun 69 from the power receiving port 101 with a small force.

At this time, the first fitting switch 77 and the release switch 79 are both "OFF" while the second fitting switch 78 is "ON," and since the release switch 79 is "OFF," L signals are input into the control circuit 144 via the fitting switches 77 and 78. Accordingly, the air compressor 55 and the vacuum pump 56 are controlled similarly to Charging Operation 2. Note that during Charging Operation 6, the timer 148 is "OFF."

[Charging Operation 7]

When the power feeding gun 69 is removed from the power receiving port 101 to return the power feeding gun 69 to the charging device 50, the second fitting switch 78 switches "OFF." Hence, the fitting switches 77 and 78 are both "OFF", and therefore, similarly to Charging Operation 3, air continues to be blasted through the communicating holes 83 in the air nozzle 67 regardless of the "ON" or "OFF" state of the release switch 79 (blower operation). As a result, the terminals 66, 62 and 63 (see FIG. 5) in the power feeding connector 68 can be prevented from becoming wet. Furthermore, when the connector holding portion 73 of the charging device 50 is wet, the water can be blown away by the air blasted through the communicating holes 83 in the air nozzle 67. Therefore, moisture can removed from the connector holding portion 73 at the same time as the power feeding connector 68 is prevented from becoming wet. Note that during Charging Operation 7, the timer 148 is "OFF."

[Charging Operation 8]

When the operator stops operating the release switch 79 such that the release switch 79 turns. "ON" and gradually inserts the power feeding connector 68 into the connector holding portion 73, first, the second fitting switch 78 turns "ON." As a result, similarly to Charging Operation 4, the air compressor 55 is stopped such that air is no longer supplied, and instead, the vacuum pump 56 is activated such that the vacuum operation state is entered. As a result, attachment of the power feeding connector 68 to the connector holding portion 73 is assisted. Note that during Charging Operation 8, the timer 148 is "OFF."

[Charging Operation 9]

When the power feeding connector 68 is completely inserted into the connector holding portion 73, the fitting switches 77 and 78 both turn "ON." Accordingly, the timer 148 is turned "ON" so that the vacuum operation by the vacuum pump 56 can be continued for a predetermined amount of time. As a result, the bellows member 71 is tightly attached to the ring-shaped cushion 72 and the power feeding connector 68 is adsorbed fixedly to the connector holding portion 73. Thus, the power feeding gun 69 can be fixed to the charging device 50 reliably. Note that when the predetermined amount of time (30 seconds or the like, for example) elapses after the timer 148 is turned "ON," the timer 148 turns "OFF," and as a result the vacuum pump 56 is stopped, whereby the charging device 50 returns to the state of Charging Operation 1 (pre-charging state).

As described in detail above, with the charging device 50 according to the first embodiment, the air nozzle 67 which blasts air to prevent the power-feeding-side terminals 62 and 63 from becoming wet is provided on the power feeding connector 68, the fitting switches 77 and 78 which are operated when the power feeding connector 68 is removed from the connector holding portion 73 are provided between the power feeding connector 68 and the connector holding portion 73, and the air compressor 55 and vacuum pump 56 are activated by the ECU 59 on the basis of operations of the fitting switches 77 and 78. Hence, the power feeding side terminals 62 and 63 of the power feeding connector 68 can be prevented from becoming wet while the power feeding connector 68 is attached to the power receiving connector 122 of the electric vehicle 100 after being removed from the connector holding portion 73. As a result, the waterproofing reliability (weather resistance) of the charging device 50 can be improved so that even when the charging device 50 is used outdoors in a location without a roof or the like, short-circuits and accompanying problems can be avoided reliably.

Further, with the charging device 50 according to the first embodiment, the air compressor 55 and vacuum pump 56 are housed in the casing 51, and therefore the outer appearance of the charging device 50 can be improved. Moreover, the outer appearance of the charging device 50 can be made uncluttered, and therefore vandalism to the charging device 50 can be prevented.

Furthermore, with the charging device 50 according to the first embodiment, the air nozzle 67 is provided between the power-feeding-side plus terminal 62 and the power-feeding-side minus terminal 63 so as to blast air radially in an orthogonal direction to the axial direction of the respective power-feeding-side terminals 62 and 63, and therefore the air nozzle 67 can blow away rainwater W and the like falling toward the power-feeding-side terminals 62 and 63, thereby preventing the power-feeding-side terminals 62 and 63 from becoming wet.

Moreover, with the charging structure according to the first embodiment, the power receiving connector 122 includes the operation wall 135 for operating the second fitting switch 78 during attachment of the power feeding connector 68, and therefore air can be blasted while the power feeding connector 68 is attached to the power receiving connector 122. Hence, rainwater W or the like adhered to the power-feeding-side terminals 62 and 63 and the power-receiving-side terminals 123 and 124 can be blown away more reliably.

Furthermore, with the charging structure according to the first embodiment, the power receiving connector 122 includes, in addition to the attachment port 131, the second air communicating passage 138 through which the reflux chamber 139 communicates with the outside, and therefore increases in the internal pressure of the power receiving connector 122 can be suppressed. Hence, an increase in the attachment load for attaching the connectors 68 and 122 can be suppressed. Moreover, when rainwater W or the like exists in the power receiving connector 122, the rainwater W can be discharged to the outside through the second air communicating passage 138.

Further, with the charging structure according to the first embodiment, the ECU 59 activates the vacuum pump 56 to perform the vacuum operation after halting the blower operation performed by the air compressor 55, and therefore the respective interiors of the power feeding connector 68 and the power receiving connector 122 can be set at a negative pressure. This negative pressure can be used to hold and support the connectors 68 and 122 during attachment, thereby facilitating attachment of the connectors 68 and 122 and preventing the power feeding connector 68 from dropping out of the power receiving connector 122 during charging.

Figure 10B:
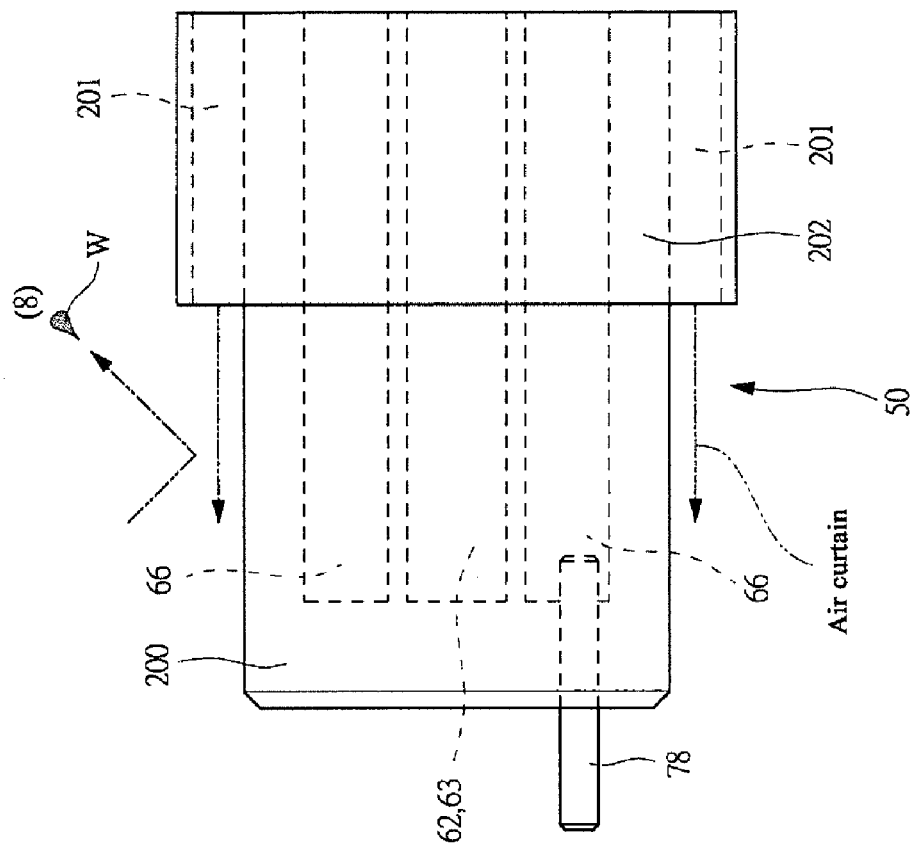
FIGS. 10A and 10B are illustrative views illustrating the structure of a power feeding connector according to a second embodiment.
Figure 10A:
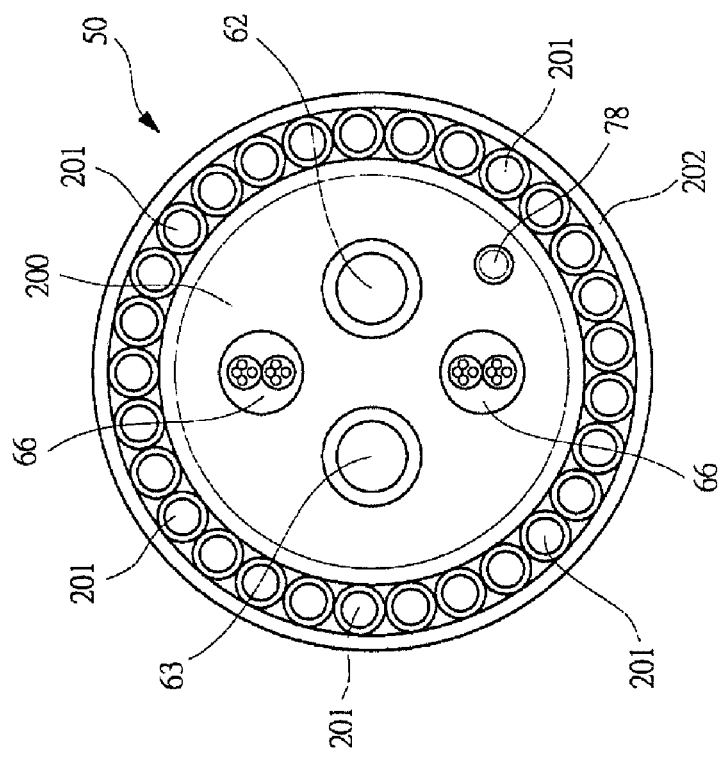

Next, a second embodiment of the present invention will be described in detail using the drawings. FIGS. 10A and 10B are illustrative views illustrating the structure of a power feeding connector according to the second embodiment. Note that parts having similar functions to their counterparts in the first embodiment have been allocated identical reference symbols and a detailed description thereof has been omitted.

The second embodiment differs from the first embodiment in the respective shapes of the power feeding connector of the charging device 50 and the power receiving connector of the electric vehicle 100.

As shown in FIGS. 10A and 10B, a power feeding connector 200 according to the second embodiment differs from that of the first embodiment in that the air nozzle 67 (see FIG. 5) provided between the terminals 66, 62 and 63 (in the central part) is replaced by a plurality of air nozzles 201 provided to surround the outside of the terminals 66, 62 and 63. Each air nozzle 201 is constituted by a small-diameter hollow pipe formed from a resin material such as plastic, for example, and as shown by chain double-dashed line arrows in FIG. 10B, the air nozzles 201 blast air in the axial direction of the terminals 66, 62 and 63. A holding pipe 202 is provided on the outside of the air nozzles 201 to hold the air nozzles 201 from the outside of the power feeding connector 200.

The air blasted from the air nozzles 201 flows toward a tip end side of the power feeding connector 200 to form a tubular air film (air curtain) covering the periphery of the power feeding connector 200, or more specifically the periphery of the terminals 66, 62 and 63. As a result, rainwater W or the like falling toward the power feeding connector 200 can be blocked by the air curtain, as shown by a chain double-dashed line arrow (8) in FIG. 10B.

When the operator grips the power feeding gun 69 (see FIG. 5) to move the power feeding gun 69 from the charging device 50 to the electric vehicle 100, for example, an opposite side of the release switch 79 relative to the power feeding connector 200 turns up (to a falling direction of the rainwater W or the like). Therefore, it is also possible to provide one air nozzle 201 only on the opposite side of the release switch 79 relative to the power feeding connector 200. In this case, the single air nozzle 201 can be caused to form a comparatively large air curtain by providing a blowhole of the air nozzle 201 with a substantially bell-shaped form that widens toward a tip end side. Note that the air curtain according to the present invention denotes any air film capable of shielding the terminals 66, 62 and 63 from the outside to block falling rainwater W or the like, and may be formed in a planar shape or the like rather than the tubular shape described above.

A plurality of air ducts (not shown) are provided in the interior of the charging cable 52 (see FIG. 3) in accordance with the plurality of air nozzles 201 provided on the periphery of the power feeding connector 200 so as to correspond to the respective air nozzles 201. Further, a power receiving connector (not shown) to which the power feeding connector 200 is attached differs from the power receiving connector 122 (see FIG. 5) according to the first embodiment in that the nozzle guide 132, reflux chamber 134, and first air communicating passages 137 are omitted. As a result, a general-purpose component having a simplified shape can be used as the power receiving connector according to the second embodiment.

In the second embodiment formed as described above, similarly to the first embodiment, the terminals 66, 62 and 63 can be prevented from becoming wet, and as a result, the waterproofing reliability (weather resistance) of the charging device 50 can be improved so that even when the charging device 50 is used outdoors in a location without a roof or the like, short-circuits and accompanying problems can be avoided reliably.

Next, a third embodiment of the present invention will be described in detail using the drawings. FIGS. 11A and 11B are illustrative views illustrating the structure of a power feeding connector according to the third embodiment. Note that parts having similar functions to their counterparts in the second embodiment have been allocated identical reference symbols and a detailed description thereof has been omitted.

The third embodiment differs from the second embodiment in that the plurality of air nozzles 201 and the holding pipe 202 are omitted, a rain guarding cover 301 that moves relative to a power feeding connector 300 is provided, and a single air nozzle 302 is formed integrally with the rain guarding cover 301.

As shown in FIGS. 11A and 11B, the power feeding connector 300 according to the third embodiment includes the rain guarding cover 301 having a substantially arc-shaped cross-section. The rain guarding cover 301 is formed from a resin material such as plastic, and is capable of moving relative to the power feeding connector 300 in an axial direction thereof, as shown by a solid line arrow in FIG. 11B.

The single air nozzle 302 is formed integrally with a bottom portion (at the top of the drawings) of the rain guarding cover 301 to extend in the axial direction of the terminals 66, 62 and 63. The air nozzle 302 is provided on the outside of the terminals 66, 62 and 63 and constituted by a hollow pipe formed from an identical material to the rain guarding cover 301. A plurality of communicating holes 303 for blasting air radially in an orthogonal direction (downward in the drawings) to the axial direction of the terminals 66, 62 and 63 are provided on a tip end side of the air nozzle 302. Note, however, that in the air nozzle 302 a substantially bell-shaped blowhole (not shown) that opens toward the terminals 66, 62 and 63 may be provided in place of the plurality of communicating holes 303.

As shown in FIG. 11B, in a normal state, or in other words a state (reference state) where the rain guarding cover 301 has not moved relative to the power feeding connector 300, the tip end side of the air nozzle 302 protrudes compared to the tip end side of the power feeding connector 300. Hence, an air curtain can be formed to cover the tip end side of the power feeding connector 300, or in other words the terminals 66, 62 and 63, as shown by chain double-dashed line arrows in the drawing. Here, the flow of the air blasted through the communicating holes 303 is bent by an inside wall surface of the rain guarding cover 301, and therefore the air curtain is formed to cover substantially the entire surface of the tip end side of the power feeding connector 300. As a result, rainwater W or the like falling toward the power feeding connector 300 can be blocked by the air curtain, as shown by a chain double-dashed line arrow (9) in the drawing.

The tip end side of the rain guarding cover 301 is capable of contacting a receiving portion (not shown) formed on the periphery of the power receiving port 101 (see FIGS. 1A and 1B) of the electric vehicle 100 when the power feeding gun 69 is attached to the power receiving port 101. Therefore, the rain guarding cover 301 moves relative to the power feeding connector 300 so that the power feeding connector 300 can be attached to the power receiving connector.

In the third embodiment formed as described above, similarly to the first embodiment, the terminals 66, 62 and 63 can be prevented from becoming wet, and as a result, waterproofing reliability (weather resistance) of the charging device 50 can be improved so that even when the charging device 50 is used outdoors in a location without a roof or the like, short-circuits and accompanying problems can be avoided reliably.

Figure 12B:
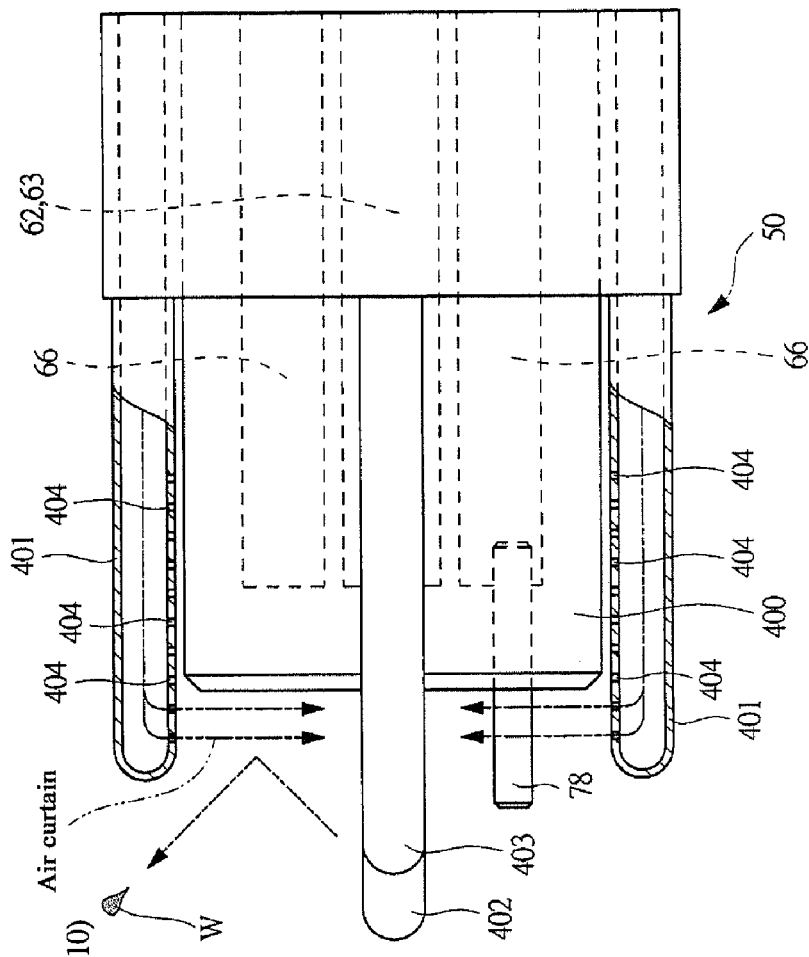
FIGS. 12A and 12B are illustrative views illustrating the structure of a power feeding connector according to a fourth embodiment.
Figure 12A:
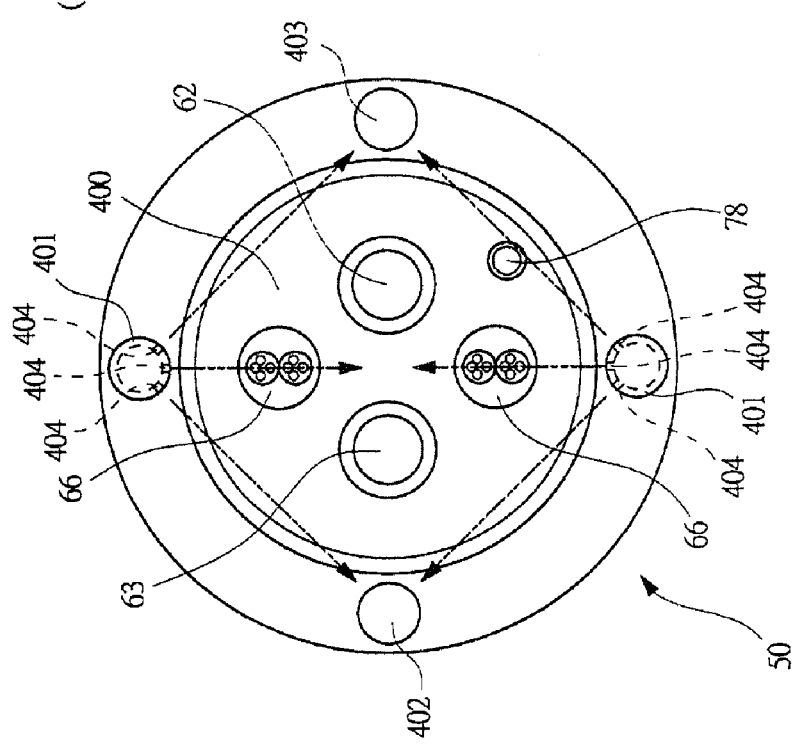

Next, a fourth embodiment of the present invention will be described in detail using the drawings. FIGS. 12A and 12B are illustrative views illustrating the structure of a power feeding connector according to the fourth embodiment. Note that parts having similar functions to their counterparts in the second embodiment have been allocated identical reference symbols and a detailed description thereof has been omitted.

The fourth embodiment differs from the second embodiment in that the plurality of air nozzles 201 and the holding pipe 202 are omitted, and a pair of air nozzles 401 and a pair of positioning pins 402 and 403 are provided on a diametrical-direction outer side of a power feeding connector 400 in respectively opposing positions.

As shown in FIGS. 12A and 12B, the power feeding connector 400 according to the fourth embodiment includes the pair of air nozzles 401 extending in the axial direction of the terminals 66, 62 and 63. The air nozzles 401 are provided on the outside of the terminals 66, 62 and 63 so as to sandwich the power feeding connector 400 from the diametrical direction. Respective tip end sides of the air nozzles 401 are provided in positions protruding compared to the tip end side of the power feeding connector 400.

A plurality of communicating holes 404 for blasting air radially in an orthogonal direction to the axial direction of the terminals 66, 62 and 63 are provided on the tip end side of the respective air nozzles 401. Note, however, that a substantially bell-shaped blowhole (not shown) that opens toward the terminals 66, 62 and 63 may be provided in each air nozzle 401 in place of the plurality of communicating holes 404.

Air is blasted through the communicating holes 404 in the respective air nozzles 401 as shown by chain double-dashed lines in the drawings, and as a result, an air curtain can be formed to cover the tip end side of the power feeding connector 400, or more specifically the terminals 66, 62 and 63. Hence, rainwater W or the like falling toward the power feeding connector 400 can be blocked by the air curtain, as shown by a chain double-dashed line arrow (10) in the FIG. 12B.

The positioning pins 402 and 403 are provided in positions deviating respectively from the air nozzles 401 by substantially 90 degree about the power feeding connector 400, and the positioning pins 402 and 403 are also disposed on the outside of the terminals 66, 62 and 63. Respective tip end sides of the positioning pins 402 and 403 are provided in positions protruding compared to the tip end side of the power feeding connector 400, and length dimensions of the positioning pin 402 and 403 are set to be greater than a length dimension of the air nozzles 401. Further, the length dimension of the positioning pin 402 is greater than the length dimension of the positioning pin 403.

Since the air nozzles 401 and the positioning pins 402 and 403 are provided in the power feeding connector 400, four positioning holes (not shown) are provided in the power receiving connector (not shown) to which the power feeding connector 400 is attached so that the respective air nozzles 401 and positioning pins 402 and 403 can be inserted therein. Hence, when the power feeding connector 400 is attached to the power receiving connector, the power feeding connector 400 is guided to the power receiving connector by inserting the air nozzles 401 and positioning pins 402 and 403 into the respective positioning holes. Here, the positioning pin 402 is inserted into its positioning hole first, followed by the positioning pin 403 and the air nozzles 401, and therefore the power feeding connector 400 can be attached to the power receiving connector easily.

In the fourth embodiment formed as described above, similarly to the first embodiment, the terminals 66, 62 and 63 can be prevented from becoming wet, and as a result, the waterproofing reliability (weather resistance) of the charging device 50 can be improved so that even when the charging device 50 is used outdoors in a location without a roof or the like, short-circuits and accompanying problems can be avoided reliably.

Next, a fifth embodiment of the present invention will be described in detail using the drawings. FIGS. 13A and 13B are illustrative views illustrating the structure of a power feeding connector according to the fifth embodiment. Note that parts having similar functions to their counterparts in the second embodiment have been allocated identical reference symbols and a detailed description thereof has been omitted.

The fifth embodiment differs from the second embodiment in that the plurality of air nozzles 201 and the holding pipe 202 are omitted, a single air nozzle 501 is provided on a diametrical direction outer side of a power feeding connector 500, and a pair of positioning pins 502 and 503 are provided in a circumferential direction of the power feeding connector 500 at equal intervals from the air nozzle 501.

As shown in FIGS. 13A and 13B, the power feeding connector 500 according to the fifth embodiment includes the single air nozzle 501 extending in the axial direction of the terminals 66, 62 and 63, and the air nozzle 501 is provided on the outside of the terminals 66, 62 and 63. A tip end side of the air nozzle 501 is provided in a position protruding compared to the tip end side of the power feeding connector 500.

A plurality of communicating holes 504 for blasting air radially in an orthogonal direction to the axial direction of the terminals 66, 62 and 63 are provided on the tip end side of the air nozzle 501. Note, however, that a substantially bell-shaped blowhole (not shown) that opens toward the terminals 66, 62 and 63 may be provided in the air nozzle 501 in place of the plurality of communicating holes 504.

Air is blasted through the communicating holes 504 in the air nozzle 501 as shown by chain double-dashed lines in the drawings, and as a result, an air curtain can be formed to cover the tip end side of the power feeding connector 500, or more specifically the terminals 66, 62 and 63. Hence, rainwater W or the like falling toward the power feeding connector 500 can be blocked by the air curtain, as shown by a chain double-dashed line arrow (11) in FIG. 13B.

The positioning pins 502 and 503 are provided in positions deviating respectively from the air nozzle 501 by substantially 120 degree about the power feeding connector 500, and the positioning pins 502 and 503 are also disposed on the outside of the terminals 66, 62 and 63. Respective tip end sides of the positioning pins 502 and 503 are provided in positions protruding compared to the tip end side of the power feeding connector 500, and length dimensions of the positioning pins 502 and 503 are set to be greater than a length dimension of the air nozzle 501. Further, the length dimension of the positioning pin 502 is greater than the length dimension of the positioning pin 503.

Since the air nozzle 501 and the positioning pins 502 and 503 are provided in the power feeding connector 500, three positioning holes (not shown) are provided in the power receiving connector (not shown) to which the power feeding connector 500 is attached so that the air nozzle 501 and the respective positioning pins 502 and 503 can be inserted therein. Hence, when the power feeding connector 500 is attached to the power receiving connector, the power feeding connector 500 is guided to the power receiving connector by inserting the air nozzle 501 and positioning pins 502 and 503 into the respective positioning holes. Here, the positioning pin 502 is inserted into its positioning hole first, followed by the positioning pin 503 and the air nozzle 501, and therefore the power feeding connector 500 can be attached to the power receiving connector easily.

In the fifth embodiment formed as described above, similarly to the first embodiment, the terminals 66, 62 and 63 can be prevented from becoming wet, and as a result, the waterproofing reliability (weather resistance) of the charging device 50 can be improved so that even when the charging device 50 is used outdoors in a location without a roof or the like, short-circuits and accompanying problems can be avoided reliably.

The present invention is not limited to the embodiments described above, and may be subjected to various modifications within a scope that does not depart from the spirit thereof. For example, in the above embodiments, the air compressor 55 and the vacuum pump 56 are provided as air supply sources, but the present invention is not limited thereto, and any air supply source that can generate positive pressure and negative pressures may be used. In this case, positive pressure and negative pressures are preferably generated by subjecting the air supply source to normal rotation control or reverse rotation control on the basis of the "ON" and "OFF" states of the respective switches 77, 78 and 79.

Further, in the above embodiments, a device that charges the high voltage battery (secondary battery) 102 installed in the electric vehicle 100 is cited as the charging device and charging structure according to the present invention, but the present invention is not limited thereto and may be applied to a device that charges a secondary battery installed in a vehicle such as an electric motorcycle or an electric wheelchair.

Moreover, in the above embodiments, a device that charges the high voltage battery 102 installed in the electric vehicle 100 is cited as the charging device and charging structure according to the present invention, but the present invention is not limited thereto and may be applied to a device that charges a secondary battery installed in a hybrid electric vehicle having a motor-generator (electric motor) and an engine.

What is claimed is:

1. A charging device for charging a secondary battery installed in a vehicle via a power receiving connector provided in said vehicle, comprising:
    a main body portion housing a power converter;
    a current carrying cable, one end side of which is connected to said power converter;
    a power feeding plug that is provided on the other end side of said current carrying cable and can be connected to a power receiving plug of said power receiving connector;
    a power feeding connector that is provided on said other end side of said current carrying cable and can be connected to said power receiving connector;
    an air duct provided in alignment with said current carrying cable such that air flows through an interior thereof;
    an air nozzle that is provided in said power feeding connector and blasts said air flowing through said air duct to prevent said power feeding plug from becoming wet;
    an air supply source provided on one end side of said air duct to supply said air to said air duct;
    a connector holding portion provided in said main body portion to hold said power feeding connector removably;
    an operation switch that is provided between said power feeding connector and said connector holding portion and operated when said power feeding connector is removed from said connector holding portion; and
    a controller housed in said main body portion to activate said air supply source on the basis of an operation of said operation switch.

2. The charging device according to claim 1, wherein said air supply source is housed in said main body portion.

3. The charging device according to claim 1, wherein said air nozzle is provided between a plus terminal and a minus terminal forming said power feeding plug, and said air nozzle blasts said air radially in an orthogonal direction to an axial direction of said power feeding plug.

4. The charging device according to claim 1, wherein said at least one air nozzle is provided on an outer side of said power feeding plug, and said air nozzle forms an air curtain that covers said power feeding plug.

5. A charging structure that includes a power receiving plug connected to a secondary battery installed in a vehicle and a power feeding plug connected to a power converter of a charging device, and connects said power feeding plug to said power receiving plug in order to charge said secondary battery,
    the structure comprising:
    a power receiving connector that is provided in said vehicle and includes said power receiving plug;
    a power feeding connector that is provided in said charging device and includes said power feeding plug;
    an attachment port that is provided in said power receiving connector and guides attachment of said power feeding connector;
    an air nozzle that is provided in said power feeding connector and blasts air to prevent said power feeding plug from becoming wet;
    a reflux chamber provided in said power receiving connector to circulate said air blasted through said air nozzle toward said attachment port;
    an air supply source provided in said charging device to supply said air to said air nozzle;
    a controller provided in said charging device to control said air supply source; and
    an operation switch that is provided in said power feeding connector and operated when said power feeding connector is attached to said power receiving connector, wherein said controller controls said air supply source to halt supply of said air on the basis of an operation of said operation switch.

6. The charging structure according to claim 5, wherein said power receiving connector includes an operation wall that operates said operation switch during attachment of said power feeding connector.

7. The charging structure according to claim 5, wherein said power receiving connector includes, in addition to said attachment port, a communicating hole that connects said reflux chamber to the outside.

8. The charging structure according to claim 5, wherein said controller causes said air supply source to perform a suction operation after halting a blasting operation of said air supply source.

9. The charging structure according to claim 7, wherein said controller causes said air supply source to perform a suction operation after halting a blasting operation of said air supply source.

* * * * *